United States Patent
Ko

(10) Patent No.: US 10,745,022 B2
(45) Date of Patent: *Aug. 18, 2020

(54) CURVE GUIDANCE METHOD, CURVE GUIDANCE APPARATUS, ELECTRONIC APPARATUS AND PROGRAM STORED IN THE COMPUTER-READABLE RECORDING MEDIUM

(71) Applicant: THINKWARE CORPORATION, Seongnam-si, Gyeonggi-do (KR)

(72) Inventor: Suk Pil Ko, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 75 days.

This patent is subject to a terminal disclaimer.

(21) Appl. No.: 16/101,050

(22) Filed: Aug. 10, 2018

(65) Prior Publication Data
US 2018/0345987 A1 Dec. 6, 2018

Related U.S. Application Data

(63) Continuation of application No. 15/259,864, filed on Sep. 8, 2016, now Pat. No. 10,071,743.

(30) Foreign Application Priority Data

Sep. 8, 2015 (KR) .................. 10-2015-0127259
Aug. 12, 2016 (KR) .................. 10-2016-0103276

(51) Int. Cl.
*B60W 50/00* (2006.01)
*G05D 1/02* (2020.01)
(Continued)

(52) U.S. Cl.
CPC .... *B60W 50/0098* (2013.01); *B60W 50/0097* (2013.01); *B60W 50/14* (2013.01);
(Continued)

(58) Field of Classification Search
CPC ............ B60W 50/0098; B60W 50/14; B60W 50/0097; B60W 2050/146;
(Continued)

(56) References Cited

U.S. PATENT DOCUMENTS 6,377,889 B1* 4/2002 Soest .................. A01B 69/008
340/990
2004/0158366 A1* 8/2004 Dieterle ............ B60K 31/0008
701/23

(Continued)

FOREIGN PATENT DOCUMENTS

JP 05/141979 A 6/1993
JP 2012-038238 A 2/2012
(Continued)

*Primary Examiner* — Rodney A Butler
(74) *Attorney, Agent, or Firm* — Novick, Kim & Lee, PLLC; Sang Ho Lee

(57) ABSTRACT

A road curve guidance method is provided. The road curve guidance method includes: obtaining link information corresponding to a road on which a vehicle is being driven; determining a position of the vehicle on a link at a future time point based on the obtained link information; and judging a degree of risk of a curve section in which the vehicle is to be driven after a predetermined time using the determined position and speed of the vehicle at a reference time point.

18 Claims, 21 Drawing Sheets

(51) Int. Cl.
 *B60W 50/14* (2020.01)
 *B62D 15/02* (2006.01)
(52) U.S. Cl.
 CPC ......... *B62D 15/029* (2013.01); *G05D 1/0214* (2013.01); *B60W 2050/146* (2013.01); *B60W 2520/10* (2013.01); *B60W 2530/10* (2013.01); *B60W 2552/30* (2020.02)
(58) Field of Classification Search
 CPC ....... B60W 2550/146; B60W 2530/10; B60W 2520/10; B60W 40/072; B60W 30/10; B60W 40/06; B60W 40/105; B62D 15/029; G05D 1/0214; B60R 16/0232
 See application file for complete search history.

(56) References Cited

U.S. PATENT DOCUMENTS

| | | | |
|---|---|---|---|
| 2006/0041372 A1* | 2/2006 | Kubota | G01C 21/3697 701/532 |
| 2006/0287817 A1 | 12/2006 | Nagel | |
| 2011/0015805 A1 | 1/2011 | Seger | |
| 2013/0006473 A1* | 1/2013 | Buerkle | B60W 30/045 701/41 |
| 2013/0187772 A1 | 7/2013 | Akiyama | |
| 2016/0052547 A1* | 2/2016 | Kashiwai | B60W 30/02 701/41 |
| 2018/0201264 A1* | 7/2018 | Schoenly | B60W 30/165 |

FOREIGN PATENT DOCUMENTS

| | | |
|---|---|---|
| JP | 2013-019680 A | 1/2013 |
| KR | 10-2007-0101562 A | 10/2007 |
| KR | 10-2011-0043290 A | 4/2011 |
| KR | 10-2011-0055854 A | 5/2011 |
| KR | 10-2012-0072137 A | 7/2012 |
| KR | 10-2014-0059082 A | 5/2014 |
| KR | 10-2014-0059095 A | 5/2014 |
| KR | 10-2014-0122945 A | 10/2014 |
| KR | 10-2015-0069247 A | 6/2015 |

\* cited by examiner (a)

(b)

(c)

CURVE GUIDANCE METHOD, CURVE GUIDANCE APPARATUS, ELECTRONIC APPARATUS AND PROGRAM STORED IN THE COMPUTER-READABLE RECORDING MEDIUM

CROSS-REFERENCE TO RELATED APPLICATION

This instant application is a continuation application of U.S. patent application Ser. No. 15/259,864 filed on Sep. 8, 2016, which claims priority under 35 USC § 119 to Korean Patent Application No. 10-2015-0127259 filed on Sep. 8, 2015, and Korean Patent Application No. 10-2016-0103276 filed on Aug. 12, 2016, with the Korean Intellectual Property Office, the disclosures of which are entirely incorporated herein by reference.

BACKGROUND OF THE INVENTION

1. Field of the Invention

The present invention relates to a curve guidance method, a curve guidance apparatus, an electronic apparatus, and a program stored in a non-transitory computer-readable recording medium, and more particularly, to a curve guidance method, a curve guidance apparatus, an electronic apparatus, and a program stored in a non-transitory computer-readable recording medium that guide a degree of risk of a curve section in real time using link information corresponding to a road.

2. Description of the Related Art

Recently, as the number of moving bodies such as vehicles continuously increases, traffic congestion has become a serious problem, and because the amount of moving bodies is more than what the infrastructure of, for example, roads, can accommodate, problems caused by traffic congestion have seriously emerged.

In this situation, a navigation apparatus is a system that receives attention as one of the solutions for traffic congestion. The navigation apparatus receives a navigation message transmitted by a satellite for a global positioning system (GPS) to judge a current position of the moving body, matches the current position of the moving body to map data to be displayed on a screen, and also searches for a driving path from the current position of the moving body to a destination. Further, the navigation apparatus allows a user to efficiently use a given road network by performing guidance so that the user may drive the moving body along the searched driving path.

Further, navigations using a function of an advanced driver assistance system (ADAS) are recently released. Here, the ADAS, which is a function for assisting a driver, may include, for example, a lane departure warning, a front vehicle starting notification, a road curve guidance, a front vehicle collision notification, and the like.

Among these, the road curve guidance is a function of informing the driver in advance a curve encountered during the driving of the vehicle. In order to perform the above-mentioned curve guidance, according to the related art, curve sections are selected by a pre-survey and the selected curve sections are added to map data of a map database (DB) in such a manner that when the vehicle passes through the corresponding point, the corresponding curve section has been guided.

However, the pre-survey method had a problem in that it is difficult to adequately respond to a road situation due to a limit that all areas may not be pre-surveyed, and was likely to provide incorrect information.

Further, since the curve guidance according to the related art merely guides whether or not the curve section exists, but does not guide a degree of risk in the curve section according to a current speed of the vehicle, there is a problem in that an accident risk in the curve section is increased or unnecessary curve guidance is performed.

SUMMARY

An aspect of the present invention may provide an adaptive curve guidance method, a curve guidance apparatus, a navigation apparatus, and a program stored in a non-transitory computer-readable recording medium that guide a degree of risk of a curve section in which a vehicle is to be driven after a predetermined time using a current speed of the vehicle and link information corresponding to a road on which the vehicle is to be driven.

An aspect of the present invention may also provide an adaptive curve guidance method, a curve guidance apparatus, and a program stored in a computer-readable recording medium that perform a safe driving speed guidance in a curve section using a driving speed of a vehicle and predicted centrifugal force calculated at a point at which the vehicle is to be located in the future.

According to an aspect of the present invention, a road curve guidance method may include: obtaining link information corresponding to a road including a plurality of links on which a vehicle is being driven; determining at least one position of the vehicle on at least one of the plurality of links at at least one future time point based on the obtained link information; and judging a degree of risk of a curve section of the road in which the vehicle is to be driven after a predetermined time using the determined at least one position and a speed of the vehicle at a reference time point which corresponds to a current position of the vehicle.

The determining of the position of the vehicle further includes respectively determining a plurality of positions of the vehicle on the plurality of links at each of a plurality of future time points, and the judging of the degree of risk of the curve section includes computing centrifugal force to be applied to the vehicle in the curve section using the plurality of determined positions and the speed of the vehicle at the reference time point, and judging the degree of risk of the curve section based on the computed centrifugal force.

The determining of the plurality of positions of the vehicle may include: determining a first position corresponding to a position of the vehicle on a first link of the plurality of links at a first time point, which is after a first time from the reference time point; determining a second position corresponding to a position of the vehicle on a second link of the plurality of links at a second time point, which is after a second time from the reference time point; and determining a third position corresponding to a position of a point on the first, the second link or a third link that is located between the first link and the second link, which is positioned farthest from a line segment connecting the first position and the second position.

The determining of the plurality of positions of the vehicle may include: determining a first position corresponding to a position of the vehicle on a first link of the plurality of links at a first time point, which is after a first time from the reference time point; determining a second position corresponding to a position of the vehicle on a second link of the plurality of links at a second time point, which is after a second time from the reference time point; and determining a third position corresponding to a position of at least one point on the first link, the second link or a third link that is located between the first link and the second link, the third position being positioned between the first position and the second position.

The judging of the degree of risk of the curve section may include generating a circumscribed circle including the first position, the second position, and the third position.

The judging of the degree of risk of the curve section may include computing the centrifugal force to be applied to the vehicle using a radius of the generated circumscribed circle and the speed of the vehicle at the reference time point.

In the judging of the degree of risk of the curve section, the degree of risk of the curve section in which the vehicle is to be driven may be judged by comparing the computed centrifugal force with a preset threshold value.

The preset threshold value may include a first threshold value, which is a judgment reference of a first risk level, and a second threshold value, which is a judgment reference of a second risk level having the degree of risk higher than that of the first risk level.

The curve guidance method may further include: when the computed centrifugal force is greater than the first threshold value and is smaller than the second threshold value, providing a first curve section guidance representing that the degree of risk of the curve section in which the vehicle is to be driven is the first risk level; and when the computed centrifugal force is greater than the second threshold value, providing a second curve section guidance representing that the degree of risk of the curve section in which the vehicle is to be driven is the second risk level.

The obtaining of the link information further includes obtaining link attribute information. The link information and link attribute information corresponding to the road on which the vehicle is being driven may be obtained from map data, and the link attribute information may include at least one of identifier of the road, a start point and an end point of a reference link of a moving direction of the vehicle, a road number, a road name, a road length, road rank information, road width information, information of the number of lanes of the road, and road slope information.

The curve guidance method may further include: computing a weight for adjusting the first threshold value and the second threshold value based on the link attribute information; and adjusting the first threshold value and the second threshold value based on the computed weight.

The weight may vary according to the link attribute information.

According to another aspect of the present invention, a curve guidance apparatus may include: a link information obtaining unit obtaining link information corresponding to a road including a plurality of links on which a vehicle is being driven; a speed sensing unit sensing speed of the vehicle; a link position determining unit determining at least one position of the vehicle on at least one of the plurality of links at at least one future time point from a reference time point which corresponds to a current position of the vehicle based on the obtained link information; and a controlling unit judging a degree of risk of a curve section of the road in which the vehicle is to be driven after a predetermined time using the determined at least one position and a speed of the vehicle at the reference time point.

The link position determining unit may respectively determine a plurality of positions of the vehicle on the plurality of links at each of a plurality of future time points, and the controlling unit may include a centrifugal force computing unit computing centrifugal force to be applied to the vehicle in the curve section using the plurality of determined positions and the speed of the vehicle of the reference time point; and a degree of risk judging unit judging the degree of risk of the curve section based on the computed centrifugal force.

The link position determining unit may include: a first link position determining unit determining a first position corresponding to a position of the vehicle on a first link of the plurality of links at a first time point, which is after a first time from the reference time point; a second link position determining unit determining a second position corresponding to a position of the vehicle on a second link of the plurality of links at a second time point, which is after a second time from the reference time point; and a third link position determining unit determining a third position corresponding to a position of a point on the first link, the second link or a third link that is located between the first link and the second link, which is positioned farthest from a line segment connecting the first position and the second position.

The link position determining unit may include: a first link position determining unit determining a first position corresponding to a position of the vehicle on a first link of the plurality of links at a first time point, which is after a first time from the reference time point; a second link position determining unit determining a second position corresponding to a position of the vehicle on a second link of the plurality of links at a second time point, which is after a second time from the reference time point; and a third link position determining unit determining a third position corresponding to a position of at least one point on the first link, the second link or a third link that is located between the first link and the second link, the third position being positioned between the first position and the second position.

The controlling unit may include a circumscribed circle generating unit generating a circumscribed circle including the first position, the second position, and the third position.

The centrifugal force computing unit may compute centrifugal force to be applied to the vehicle using a radius of the generated circumscribed circle and the speed of the vehicle at the reference time point.

The degree of risk judging unit may judge the degree of risk of the curve section in which the vehicle is to be driven by comparing the computed centrifugal force with a preset threshold value.

The preset threshold value may include a first threshold value, which is a judgment reference of a first risk level, and a second threshold value, which is a judgment reference of a second risk level having the degree of risk higher than that of the first risk level.

The controlling unit may further include a guidance information generating unit generating a first curve section guidance representing that the degree of risk of the curve section in which the vehicle is to be driven is the first risk level when the computed centrifugal force is greater than the first threshold value and is smaller than the second threshold value, and generating a second curve section guidance representing that the degree of risk of the curve section in which the vehicle is to be driven is the second risk level when the computed centrifugal force is greater than the second threshold value.

The link information obtaining unit may further obtain link attribute information. The link information and link attribute information corresponding to the road on which the vehicle is being driven can be obtained from map data, and the link attribute information may include at least one of identifier of the road, a start point and an end point of a reference link of a moving direction of the vehicle, a road number, a road name, a road length, road rank information, road width information, information of the number of lanes of the road, and road slope information.

The controlling unit may further include a weight computing unit computing a weight for adjusting the first threshold value and the second threshold value based on the link attribute information, and adjusting the first threshold value and the second threshold value based on the computed weight.

The weight computed by the weight computing unit may vary according to the link attribute information.

When the vehicle enters the curve section, the first link position determining unit may determine the first position by shortening the first time.

According to another aspect of the present invention, an electronic apparatus may include: an output unit outputting information for guidance; a link information obtaining unit obtaining link information corresponding to a road on which a vehicle is being driven; a link position determining unit determining a position of the vehicle on a link at a future time point; and a controlling unit judging a degree of risk of a curve section in which the vehicle is to be driven after a predetermined time using the determined position and a speed of the vehicle at a reference time point, and controlling the output unit so as to output a curve section guidance corresponding to the judged degree of risk.

The degree of risk of the curve section may include de a plurality of levels, and the curve section guidance may include a first curve section guidance output by the output unit when the degree of risk of the curve section in which the vehicle is to be driven is a first risk level, and a second curve section guidance output by the output unit when the degree of risk of the curve section in which the vehicle is to be driven is a second risk level.

The output unit may include a display unit having a screen, and the display unit may position and display a curve guidance object on a predetermined area of an augmented reality screen.

According to another aspect of the present invention, a curve guidance method may include: measuring a current position and a current moving speed of an electronic apparatus using a received global positioning system (GPS) signal; generating a curve link based on a plurality of links corresponding to a road positioned in a moving direction of the electronic apparatus from the current position; determining at least three points where the electronic apparatus would be positioned at future time points according to the measured current moving speed from the curve link; calculating a radius of a circumscribed circle passing through the at least three the determined points; calculating centrifugal force to be applied to a vehicle a vehicle that would move on the circumscribed circle using the calculated radius and the measured current moving speed; comparing the calculated centrifugal force with a preset threshold value; and outputting guidance on whether or not the vehicle which would move on a curved road positioned on a front section at the current moving speed would be dangerous to a user according to a comparison result.

The threshold value may vary according to link attribute information corresponding to the road on the front section.

The link attribute information may include at least one of identifier of the road, a start point and an end point of a reference link of a moving direction of the vehicle, a road number, a road name, a road length, road rank information, road width information, information of the number of lanes of the road, and road slope information.

The preset threshold value may be a threshold value obtained by experimental data, and include a first threshold value, which is an experimental value for informing a risk that the vehicle deviates from a road of a curve section when the vehicle passes through the curve section, and a second threshold value, which is an experimental value for informing a turnover risk of the vehicle that passes through the curve section, and the outputting of the guidance may include displaying an attention guidance when the centrifugal force is greater than the first threshold value and is smaller than the second threshold value, and displaying a warning guidance when the centrifugal force is greater than the second threshold value.

According to another aspect of the present invention, a curve guidance apparatus may include: a speed sensing unit measuring a current position and current moving speed of an electronic apparatus using a received global positioning system (GPS) signal; a curve link generating unit configured for generating a curve link based on a plurality of links corresponding to a road positioned on a front section in a moving direction of the electronic apparatus from the current position; a link position determining unit determining at least three points where the electronic apparatus would be positioned according to the measured current moving speed from the curve link; and a controlling unit calculating a radius of a circumscribed circle passing through the at least three determined points, calculating centrifugal force to be applied to a vehicle when the vehicle would move on the circumscribed circle using the calculated radius and the measured current moving speed, comparing the calculated centrifugal force with a preset threshold value, and outputting guidance on whether or not the vehicle which would move on a curved road positioned on a front section at the current moving speed would be dangerous to a user according to a comparison result.

The threshold value may vary according to link attribute information corresponding to the road on the front section.

The link attribute information may include at least one of identifier of the road, a start point and an end point of a reference link of a moving direction of the vehicle, a road number, a road name, a road length, road rank information, road width information, information of the number of lanes of the road, and road slope information.

The preset threshold value may be a threshold value obtained by experimental data, and include a first threshold value, which is an experimental value for informing a risk that the vehicle deviates from a road of a curve section when the vehicle passes through the curve section, and a second threshold value, which is an experimental value for informing a turnover risk of the vehicle that passes through the curve section, and the controlling unit may display an attention guidance when the centrifugal force is greater than the first threshold value and is smaller than the second threshold value, and display a warning guidance when the centrifugal force is greater than the second threshold value.

According to another aspect of the present invention, a curve guidance method may include: obtaining link information on a plurality of links corresponding to a road on which a vehicle is to be driven; determining two or more future position points respectively on two or more of the plurality of links positioned on a moving direction from a position of a vehicle which is currently being driven using the obtained link information; and judging a degree of risk of a curve section of the road using the two or more determined points and driving speed information of the vehicle.

The curve guidance method may further include: determining a point on a link which is positioned farthest from a line segment connecting the two or more future position points; and generating a circumscribed circle including the determined three or more points, where the judging of the degree of risk of the curve section includes calculating the degree of risk of the curve section using a radius of the generated circumscribed circle and the driving speed information.

The calculating of the degree of risk may include: calculating centrifugal force of the curve section using the radius of the circumscribed circle and the driving speed; and providing the degree of risk of the curve section to a user by comparing the calculated centrifugal force with a preset threshold value.

The curve guidance method may further include: determining a third point, which is a point on a link positioned farthest from a line segment connecting the two or more future position points; computing an angle formed by the determined third point and the two end points of the line segment connecting the two or more points; and providing the degree of risk of the curve section to a user by comparing the computed angle with a preset threshold value.

According to another aspect of the present invention, a non-transitory computer readable recording medium may have a program for performing the curve guidance method recorded thereon.

DETAILED DESCRIPTION

Figure 1:
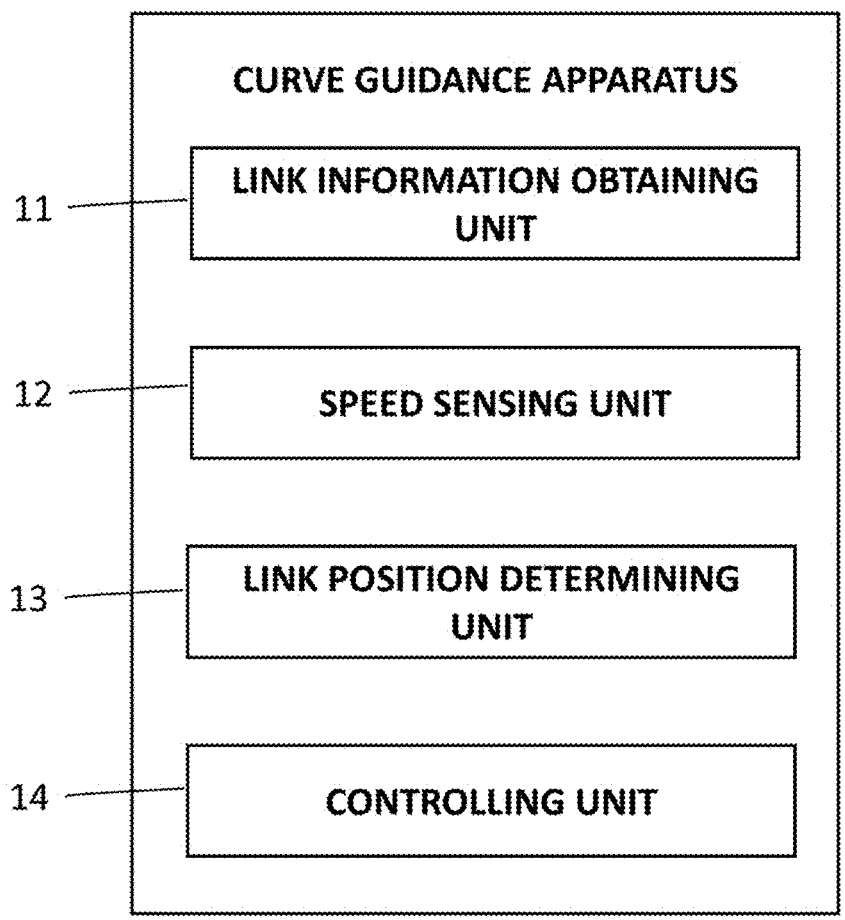
FIG. 1 is a block diagram illustrating a curve guidance apparatus according to an exemplary embodiment of the present invention.

The following description illustrates only a principle of the present invention. Therefore, those skilled in the art may implement the principle of the present invention and invent various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices invented so as to perform the same function regardless of a structure.

Therefore, it is to be understood that, for example, a block diagram of the present specification shows a conceptual aspect of an illustrative circuit for embodying a principle of the present invention. Similarly, it is to be understood that all flow charts, state transition views, pseudo-codes, and the like show various processes that may be tangibly embodied in a computer-readable medium and that are executed by computers or processors regardless of whether or not the computers or the processors are clearly illustrated.

Functions of various devices including processors or functional blocks represented as concepts similar to the processors and illustrated in the accompanying drawings may be provided by hardware having capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods of performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a scheme demanded by the claims in the present invention defined by the claims, any means capable of providing these functions are equivalent to means recognized from the present specification.

The above-mentioned objects, features, and advantages will become more obvious from the following detailed description associated with the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make the gist of the present invention unclear, it will be omitted.

Hereinafter, various exemplary embodiments of the present invention will be described in detail with reference to the accompanying drawings.

Figure 2:
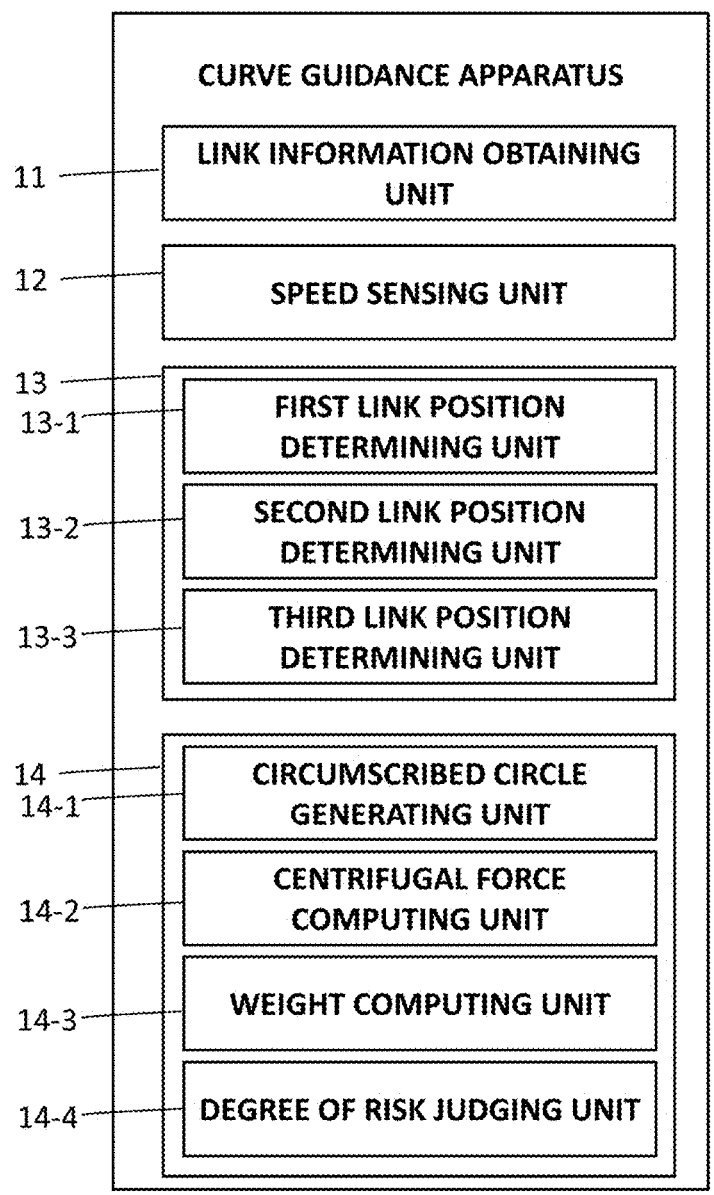
FIG. 2 is a block diagram specifically illustrating a curve guidance apparatus according to an exemplary embodiment of the present invention.

FIG. 1 is a block diagram illustrating a curve guidance apparatus according to an exemplary embodiment of the present invention. FIG. 2 is a block diagram specifically illustrating a curve guidance apparatus according to an exemplary embodiment of the present invention.

Referring to FIGS. 1 and 2, a curve guidance apparatus 10 may include all or some of a link information obtaining unit 11, a speed sensing unit 12, a link position determining unit 13, and a controlling unit 14. Here, the link position determining unit 13 may include all or some of a first link position determining unit 13-1, a second link position determining unit 13-2, and a third link position determining unit 13-3. Further, the controlling unit 14 may include all or some of a circumscribed circle generating unit 14-1, a centrifugal force computing unit 14-2, a weight computing unit 14-3, and a degree of risk judging unit 14-4.

The curve guidance apparatus 10 may obtain link information corresponding to a road on which a vehicle is being driven, may determine a position of the vehicle on a link after a predetermined time from a reference time point, and judge a degree of risk of a curve section in which the vehicle is to be driven after the predetermined time using the determined position and speed of the vehicle at the reference time point. Here, the curve guidance apparatus 10 may be implemented using software, hardware, or a combination thereof. As an example, according to the hardware implementation, the curve guidance apparatus 10 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and electrical units for performing other functions.

Such the curve guidance apparatus 10 may perform a curve judgment using link information corresponding to the road on which the vehicle is being driven.

To this end, the link information obtaining unit 11 may obtain the link information corresponding to the road on which the vehicle is being driven. Specifically, the link information obtaining unit 11 may obtain the link information corresponding to the road on which the vehicle is being driven and link attribute information for the corresponding link from map data including a plurality of links for representing roads within many areas.

Here, the link information obtaining unit 11 may obtain the map data from a storing unit 110 of an electronic apparatus 100 in which the curve guidance apparatus 10 is installed, or may obtain the map data via wired/wireless communications from an external map database (DB) which is independent from the electronic apparatus 100, or may obtain the map data from another electronic apparatus. For example, the link information obtaining unit 11 may obtain the map data from a map data provider via a mobile communications network such as a long term evolution (LTE) or a wireless communications network such as a wireless local area network (LAN).

The map data, which is data for representing the current position and a map of a surrounding area, may include the link information for representing the roads within many areas included in the map data.

The link information may include at least one of information of a plurality of links, link attribute information representing an attribute value for each of the plurality of links, information of a node connecting the links, and attribute information for the node.

The link attribute information may include at least one of identifier of the link, information representing whether or not the link is a bi-directional link or a uni-directional link, a start point and an end point of a reference link of a moving direction of the vehicle, a road number, a road name, a road length, road rank information, road type information, road width information, information of the number of lanes of the road, road slope information, and guidance code information (e.g., information guiding a speed limit, an enforcement point, and the like) as illustrated in Table 1. Further, the attribute information for the node may include direction attribute information.

Here, the bi-directional link may mean a link that defines two-ways, that is, a left road and a right road based on a centerline of the road as one link.

In addition, the slope information of the road corresponding to the link may include longitudinal slope information (longitudinal slope) representing a downward angle or an upward angle for a length concatenated on a horizontal line of the road. Here, it may be judged based on the longitudinal slope information whether the road corresponding to the corresponding link is an uphill road or a downhill road. As one exemplary embodiment, if the road is the uphill road in the movement direction of the vehicle, the longitudinal slope information has a "positive (+)" value, and if the road is the downhill road, the longitudinal slope information has a "negative (−)" value.

In addition, the slope information of the road corresponding to the link may include superelevation information (Cant) representing a gradient of a width concatenated on the horizontal line of the road. Here, the superelevation of the road corresponding to the corresponding link may be judged based on the superelevation information. That is, the superelevation information is information representing whether an end of an outer lane in a curved portion of the road is designed to be higher than an inner lane at an angle of some extent. As one exemplary embodiment, if the slope is increased in an outer direction of the road at the center of the road, the superelevation information has a "positive (+)" value, and if the slop is decreased, the superelevation information has a "negative (−)" value.

TABLE 1

| Attribute | Description |
|---|---|
| Road ID | Identifier for identifying link |
| Link Directionality Information | Information representing whether link is bi-directional or uni-directional |
| Link Start Point Information | Link start node identifier |
| Link End Point Information | Link end node identifier |
| Road No. | Road unique number |
| Road Name | Road name |
| Road Length | Road length information |
| Road Rank | Information representing rank of road (rank such as highway, general road, etc.) |
| Road Type | Type of road (type such as general road, elevated road, underground road, etc.) |
| Road Width Information | Width information of road |
| Information of Number of Lanes of Road | Number of lanes of road |
| Road Slope Information | Road longitudinal slope information, road superelevation information |
| Guidance Code Information | Speed limit, enforcement section, driving caution section, accident hazard information |

The speed sensing unit 12 may sense speed of a moving body in which the curve guidance apparatus 10 is installed, for example, a vehicle, a bicycle, a person, or the like (hereinafter, collectively refers the moving body as the vehicle for convenience of explanation).

The link position determining unit 13 may determine a position of the vehicle on the link after a predetermined time from the reference time point. Such the link position determining unit 13 may include a first link position determining unit 13-1 that determines a first position corresponding to a position of the vehicle on the link at a first time point, which is after a first time from the reference time point, a second link position determining unit 13-2 that determines a second position corresponding to a position of the vehicle on the link at a second time point, which is after a second time from the reference time point, and a third link position determining unit 13-3 that determines a third position corresponding to a position of at least one point on the link positioned between the first position and the second position.

Here, the third link position determining unit 13-3 may preferably determine a position of a point on the link which is positioned farthest from a line segment connecting the first position and the second position, as the third position. However, the third link position determining unit 13-3 is not limited thereto, but it may determine a position of a point on the link positioned between the first position and the second position, as the third position, according to different embodiments.

In addition, although the example described above describes only a case in which positions of three links are determined in a front link of a current time point of the vehicle, the present invention is not limited thereto. For example, positions of three or more links in which the moving body may be positioned after the predetermined time from the current time point of the moving body may be determined, and a degree of risk of a curve section in which the vehicle is to be driven after the predetermined time may be judged using the determined positions of the links.

Meanwhile, the reference time point may be the current, and the first time point and the second time point may be future time points after the predetermined time from the current. In addition, the second time point may be a future time point later than the first time point. For example, the first time point may be a time point after 1 second from the reference time point, and the second time point may be a time point after 5 seconds from the reference time point.

Meanwhile, the controlling unit 14 may judge the degree of risk of the curve section in which the vehicle is to be driven after the predetermined time, using the position determined by the link position determining unit 13 and the current speed of the vehicle at the reference point sensed by the speed sensing unit 12.

In this case, the controlling unit 14 may compute predicted centrifugal force of a case in which the vehicle is driven at the current driving speed in the curve section, may compare the computed predicted centrifugal force with a predefined threshold value, and may judge a degree of risk of a case in which the vehicle is driven at the current speed on a curve road positioned on a front section, depending on the comparison result.

To this end, the circumscribed circle generating unit 14-1 may generate a circumscribed circle including the first position, the second position, and the third position. In addition, the centrifugal force computing unit 14-2 may compute centrifugal force for the circumscribed circle using a radius of the generated circumscribed circle and the speed of the vehicle at the reference time point. In addition, the degree of risk judging unit 14-4 may judge the degree of risk of the curve section in which the vehicle is to be driven after the predetermined time by comparing the computed centrifugal force with a preset threshold value. Here, the preset threshold value, which is a threshold value obtained from experimental data through an actual road driving test, may include a first threshold value, which is a judgment reference of a first risk level (a state in which there is risk that the vehicle gets out of the road of the curve section when the vehicle passes through the curve section), and a second threshold value, which is a judgment reference of a second risk level (a state in which there is turnover risk of the vehicle when the vehicle passes through the curve section) having the degree of risk higher than that of the first risk level.

In addition, the controlling unit 14 may include a weight computing unit 14-3. The weight computing unit 14-3 may compute a weight for the threshold value based on at least one of the road rank information, the road width information, the information of the number of lanes of the road, and the road slope information of the obtained link information, and may adjust a preset threshold value based on the computed weight.

Hereinafter, two cases in which the weight computing unit 14-3 changes the weight according to the link attribute information will be described.

<Case 1>

In Case 1, the weight computing unit 14-3 may set the weight to "1" or a "value greater than 1" according to the link attribute information. For example, the "value greater than 1" will be a value including decimal places that exceed 1 including "1.001".

In a case in which the number of lanes of the curve section is large, the degree of risk felt by the driver in relation to the curve section will be smaller than a case in which the number of lanes of the curve section is small. Therefore, in Case 1, when the number of lanes of the road obtained by the link information obtaining unit 11 is a preset number of lanes (one-lane), the weight computing unit 14-3 may compute the weight as a value of '1'. In addition, when the number of lanes of the road obtained by the link information obtaining unit 11 is greater than the preset number of lanes (one-lane), the weight computing unit 14-3 may compute the weight as a value greater than '1'.

As another example, the weight computing unit 14-3 may further consider a weight of 0.1 for each of the exceeded number of lanes whenever the number of lanes exceeds one-lane. If the number of lanes is one, the weight computing unit 14-3 may compute "1" as the weight, if the number of lanes is two that exceeds one-lane by another, the weight computing unit 14-3 may compute "1.1" as the weight, if the number of lanes is three, the weight computing unit 14-3 may compute "1.2" as the weight, and if the number of lanes is four, the weight computing unit 14-3 may compute "1.3" as the weight.

As another example, in a case in which the rank of the road to which the curve section belongs is the highway, the degree of risk felt by the driver in relation to the curve section will be smaller than the general road. Therefore, in a case in which the road rank obtained by the link information obtaining unit 11 is the general road, the weight computing unit 14-3 may compute the weight as '1'. In addition, in a case in which the road rank obtained by the link information obtaining unit 11 is the highway, the weight computing unit 14-3 may compute the weight as a value greater than '1'.

As still another example, in a case in which the road width of the curve section is wide, the degree of risk felt by the driver in relation to the curve section will be smaller than a case in which the road width of the curve section is narrow. Therefore, in a case in which the road width obtained by the link information obtaining unit 11 is the same as a preset value, the weight computing unit 14-3 may compute the weight as '1'. In addition, in a case in which the road width obtained by the link information obtaining unit 11 is greater than the preset value, the weight computing unit 14-3 may compute the weight as a value greater than '1'.

As still another example, in a case in which the curve section is on the uphill road, the degree of risk felt by the driver in relation to the curve section will be smaller than a case in which the curve section is on the downhill road. Therefore, in a case in which the road longitudinal slope obtained by the link information obtaining unit 11 is the uphill road, the weight computing unit 14-3 may compute the weight as a value greater than '1'. In addition, in a case in which the road longitudinal slope obtained by the link information obtaining unit 11 is the downhill road, the weight computing unit 14-3 may compute the weight as a value smaller than '1'. In addition, in a case in which the obtained road longitudinal slope is a flatland, the weight computing unit 14-3 may not compute the weight or may compute the weight as '1'.

As still another example, in a case in which the superelevation of the curve section is large, the degree of risk felt by the driver in relation to the curve section will be smaller than a case in which the superelevation of the curve section is small. Therefore, in a case in which the superelevation of the road obtained by the link information obtaining unit 11 is greater than a preset value, the weight computing unit 14-3 may compute the weight as the value greater than '1'. In addition, in a case in which the superelevation of the road obtained by the link information obtaining unit 11 is smaller than the preset value, the weight computing unit 14-3 may compute the weight as '1'.

In addition, in a case in which the superelevation of the road obtained by the link information obtaining unit 11 is the same as the preset value, the weight computing unit 14-3 may compute the weight as '1'. Besides, the weight computing unit 14-3 may compute both the weights of the flatland and the downhill road as '1'.

<Case 2>

In Case 2, the weight computing unit 14-3 may set the weight to "1" or a "value smaller than 1" or a "value greater than 1" according to the link attribute information. For example, the "value greater than 1" will be a value including decimal places that exceed 1 including "1.001", and the "value smaller than 1" may be a value that is more than "0" but less than "1".

As an example, in a case in which the number of lanes of the curve section is large, the degree of risk felt by the driver in relation to the curve section will be smaller than a case in which the number of lanes of the curve section is small. Therefore, in Case 2, when the number of lanes of the road obtained by the link information obtaining unit 11 is smaller than a preset reference number of lanes (two-lanes), the weight computing unit 14-3 may compute the weight as a value smaller than "1". In addition, when the number of lanes of the road obtained by the link information obtaining unit 11 is greater than the preset number of lanes, the weight computing unit 14-3 may compute the weight as a value greater than '1'. For example, in a case in which the number of lanes of the obtained link attribute information is one-way, since the number of lanes is smaller than the reference number of lanes, the weight computing unit 14-3 may compute the weight as "0.9", in a case in which the number of lanes of the obtained link attribute information is the reference number of lanes (two-lanes), the weight computing unit 14-3 may compute the weight as "1", and in a case in which the number of lanes of the obtained link attribute information is three-lanes, since the number of lanes exceeds the reference number of lanes, the weight computing unit 14-3 may compute the weight as "1.1". As still another example, depending on whether the road width of the curve section is same as a reference road width (e.g., 1.8 m) of the curve section or is wider or narrower than the reference road width thereof, the weight computing unit 14-3 may set the weight "1" or the "value smaller than 1" or the "value greater than 1".

In a case in which the road width of the curve section included in the obtained link attribute information is wide, the degree of risk felt by the driver in relation to the curve section will be smaller than a case in which the road width of the curve section is narrow. Therefore, the weight computing unit 14-3 may set the weight to "1" or the "value smaller than 1" or the "value greater than 1" by comparing the road width obtained by the link information obtaining unit 11 with a preset value.

As still another example, in a case in which the curve section is on the uphill road, the degree of risk felt by the driver in relation to the curve section will be smaller than a case in which the curve section is on the downhill road. Therefore, the weight computing unit 14-3 may compare the road longitudinal slope information obtained by the link information obtaining unit 11 with reference road longitudinal slope information (e.g., 0 degree) to thereby set the weight to "1" or the "value smaller than 1" or the "value greater than 1" according to the comparison result.

If the obtained road longitudinal slope information is 0 degree, the weight computing unit 14-3 may assume that the road is a horizontal road and compute the weight as "1", if the obtained road longitudinal slope information is 0 degree or more, the weight computing unit 14-3 may assume that the road is the uphill road, if the obtained road longitudinal slope information is more than 0 degree but less than 5 degree, the weight computing unit 14-3 may compute the weight as "1.1, and if the obtained road longitudinal slope information is more than 5 but less than 10 degrees, the weight computing unit 14-3 may compute the weight as "1.2".

In contrast, if the obtained road longitudinal slope information has a "negative (−)" value, the weight computing unit 14-3 may assume that the road is the downhill road, if the obtained road longitudinal slope information is "0 degree to −5 degrees", the weight computing unit 14-3 may compute the weight as "0.9", and if the obtained road longitudinal slope information is "−5 degree to −10 degrees", the weight computing unit 14-3 may compute the weight as "0.8".

As described above, the weight computing method described above may be equally applied to even the case of the superelevation of the road. That is, the weight computing unit 14-3 may compare the superelevation information with reference road superelevation information (e.g., 0 degree) according to the obtained superelevation information of the road to thereby set the weight to "1" or the "value smaller than 1" or the "value greater than 1" according to the comparison result.

Although the two cases described above describe the examples in which the weight computing unit 14-3 computes the weight according to the obtained link attribute information, the weight may also be varied according to mass of the vehicle. Since magnitude of the centrifugal force is increased in proportion to the mass of the vehicle, the degree of risk felt by the driver of a vehicle having light mass in relation to the curve section will be relatively smaller than that of a vehicle having heavy mass. Therefore, the weight computing unit 14-3 may set the weight to "1" or a "value smaller than 1" or a "value greater than 1" according to the mass of the vehicle.

For example, in a case in which the mass of the vehicle is 2 tons, the weight computing unit 14-3 computes the weight as "1", whenever the mass of the vehicle is increased by 0.5 tons, the weight computing unit 14-3 decreases the weight by "0.1", and whenever the mass of the vehicle is decreased by 0.5 tons, the weight computing unit 14-3 increases the weight by "0.1".

Meanwhile, although the example described above describes the case in which the weight is computed based on the road attribute information obtained by the link information obtaining unit 11, the present invention is not limited thereto. According to another embodiment of the present invention, the curve guidance apparatus 10 may include a sensor (not shown) for sensing at least one of the road rank information, the road width information, and the information of the number of lanes of the road. In this case, the weight computing unit 14-3 may compute the weight for the threshold value based on the road attribute information obtained by the link information obtaining unit 11 and/or a sensed value of the sensor (not shown). As an example, the curve guidance apparatus 10 may include a sensor (not shown) for measuring a longitudinal gradient and a transverse gradient of the vehicle. In this case, the weight computing unit 14-3 may compute the weight for the threshold value based on a gradient value of the sensor (not shown) for measuring a gradient without the road slope information obtained by the link information obtaining unit 11.

According to the present invention, the threshold value of the guidance of the degree of risk is adjusted by reflecting factors capable of influencing the degree of risk of the curve section which is felt by a sensory organ of the user, for example, the road rank (e.g., whether the road is the highway or the general road), the road width, the number of lanes of the road (e.g., whether the number of lane of the road is large or small), the road slope (e.g., whether the road is the uphill road or the downhill road, thereby making it possible to more accurately perform the guidance for the degree of risk of the curve section. Additionally, as the factor capable of influencing the degree of risk of the curve section, a kind of pavement of a road surface (e.g., an asphalt pavement, a concrete pavement, etc.) may be considered.

Besides, the weight computing unit 14-3 may also change the weight according to information such as a track tread of the vehicle, a width of the vehicle, a height of the vehicle, a state of a tire, a surface friction coefficient, and the like.

Figure 3:
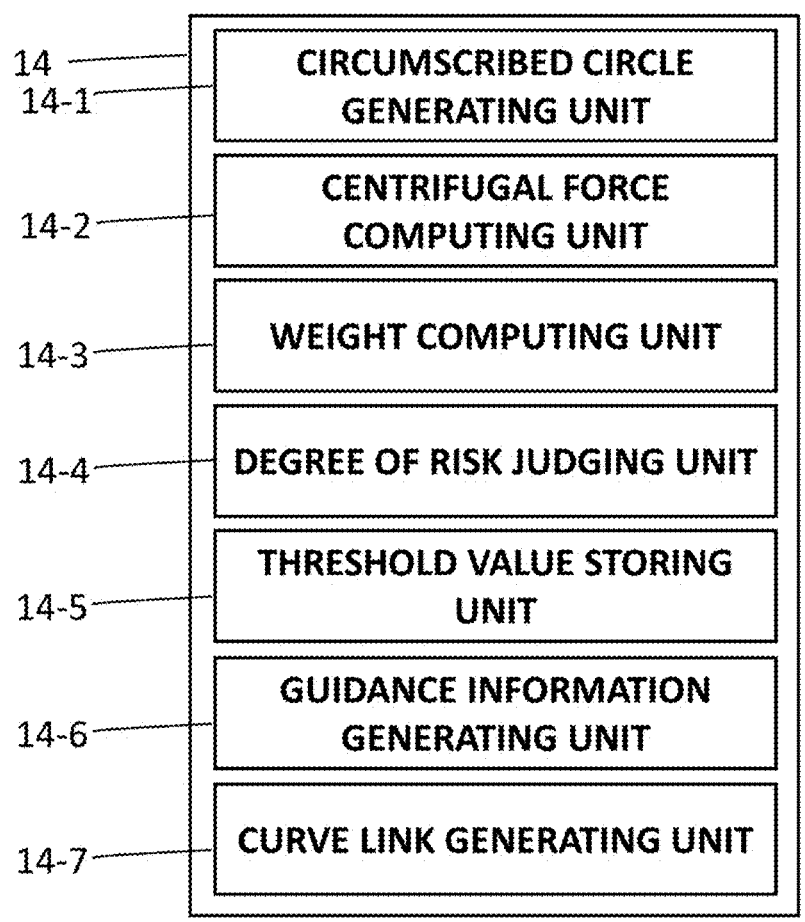
FIG. 3 is a block diagram specifically illustrating a controlling unit of a curve guidance apparatus according to another exemplary embodiment of the present invention.

FIG. 3 is a block diagram of a controlling unit 14 of a curve guidance apparatus 10 according to another exemplary embodiment of the present invention. In FIG. 3, since the circumscribed circle generating unit 14-1 and the centrifugal force computing unit 14-2 are the same as block configurations illustrated in FIG. 2, a description thereof will be omitted. In FIG. 3, a threshold value storing unit 14-5 may pre-store two or more threshold values. The threshold values stored in the threshold value storing unit 14-5 are threshold values obtained as experimental data through the actual road driving test, and stores a first threshold value, which is an experimental value for informing (attention) a risk that the vehicle gets out of the road of the curve section when the vehicle passes through the curve section, and a second threshold value, which is an experimental value for informing (warning) a turnover risk of the vehicle that will pass through the curve section. Although another exemplary embodiment of the present invention describes the two threshold values, it is also possible to predetermine and store three or more threshold values depending on a selection of a user or a manufacturer.

Of course, it is also possible to preset only one threshold value, and to display information on whether or not the curve section is dangerous depending on whether or not the threshold value has exceeded.

Meanwhile, in a case in which the computed centrifugal force is smaller than the first threshold value, since the curve section in which the vehicle is to be driven is not dangerous, a guidance information generating unit 14-6 may not generate curve section guidance.

In addition, in a case in which the computed centrifugal force is greater than the first threshold value and is smaller than the second threshold value, the guidance information generating unit 14-6 may generate a first curve section guidance representing that the degree of risk of the curve section in which the vehicle is to be driven is the first risk level. Here, the first curve section guidance may be attention guidance for informing a risk that the vehicle deviates from the road of the curve section when the vehicle passes through the curve section.

In addition, in a case in which the computed centrifugal force is greater than the second threshold value, the guidance information generating unit 14-6 may generate a second curve section guidance representing that the degree of risk of the curve section in which the vehicle is to be driven is the second risk level. Here, the second curve section guidance may be a warning guidance for informing the turnover risk of the vehicle that will pass through the curve section.

Meanwhile, the controlling unit 14 may include a curve link generating unit 14-7 that generates a curve link corresponding to the link using a curve algorithm. Specifically, an actual moving path of the vehicle is a curve, but the links are formed in a straight line. Therefore, in a case in which the positions of the links are determined, or the centrifugal force is computed by intactly using the prestored links, data to which actual moving characteristics of the vehicle are reflected is computed, and as a result, accurate guidance of the degree of risk may not be performed. Therefore, according to an exemplary embodiment of the present invention, after obtaining the link information through the link information obtaining unit 11, the curve link generating unit 14-7 may generate the curve link corresponding to the link obtained using the curve algorithm such as a Bezier curve algorithm. In this case, the link position determining unit 13 determines a position of the vehicle at a future time point on the curve link, and the controlling unit 14 judges the degree of risk of the curve section in which the vehicle is to be driven using the position at the future time point determined on the curve link and the speed of the vehicle at the reference time point, thereby making it possible to more accurately guide the degree of risk of the curve section.

An operation of the curve guidance apparatus 10 of FIGS. 1 and 2 will be described in more detail with reference to FIGS. 4 to 8. The curve guidance apparatus 10 according to the present invention may judge the degree of risk of the curve section positioned at the front of the moving body as well as provide guidance of speed which is safe for driving the curve section positioned at the front of the moving body to the user.

Figure 4:
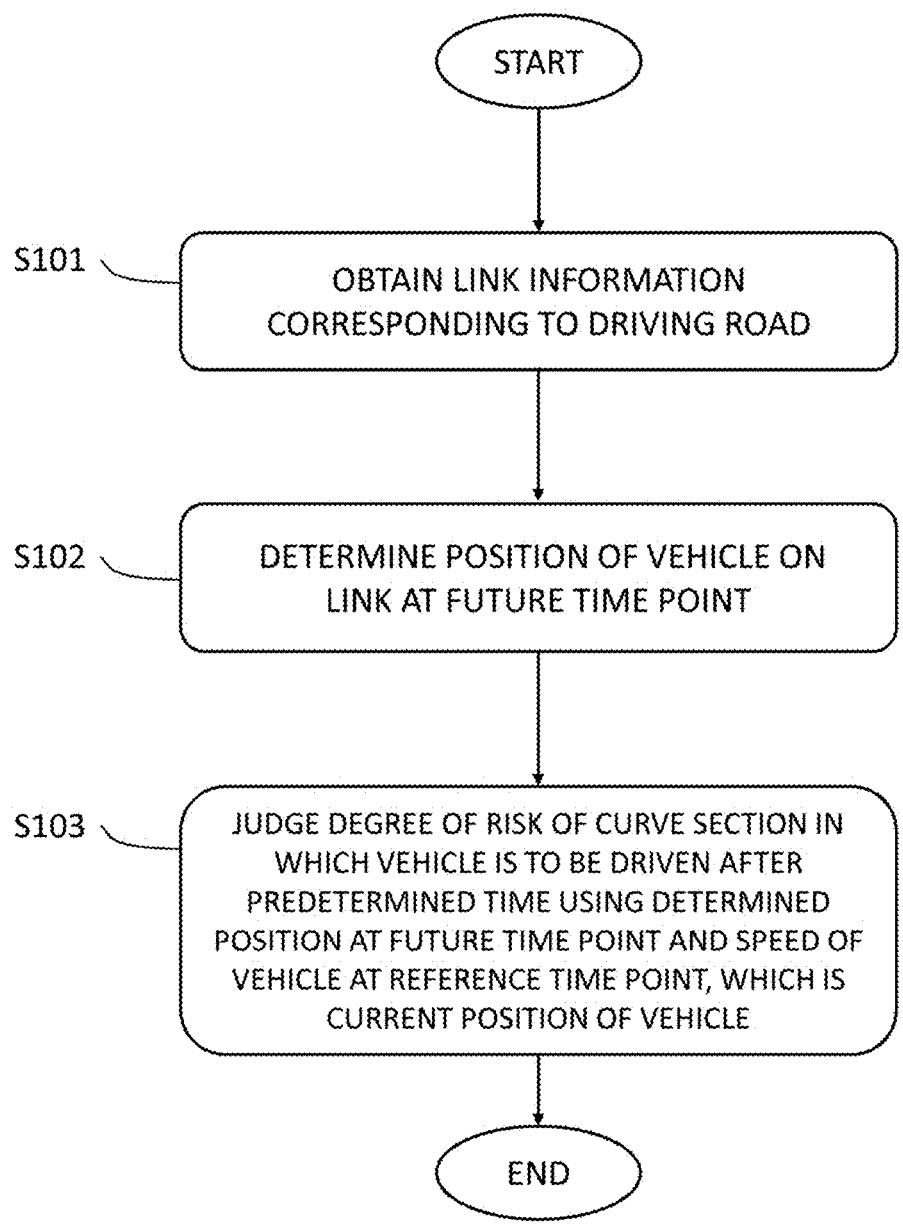
FIG. 4 is a flowchart illustrating a curve guidance method according to an exemplary embodiment of the present invention.

FIG. 4 is a flowchart illustrating a curve guidance method according to an exemplary embodiment of the present invention. Referring to FIG. 4, first, the curve guidance apparatus 10 may obtain link information corresponding to a road on which a vehicle is being driven (S101). Specifically, the link information obtaining unit 11 may obtain the link information corresponding to the road on which the vehicle is being driven from map data including a plurality of links for representing roads within many areas.

Here, the link information may include the plurality of links and attribute information on each of the plurality of links, information on a node connecting a link and another link, attribute information on the node, and the like.

In addition, the curve guidance apparatus 10 may determine a position of the vehicle on the link at a future time point (S102). A description thereof will be provided in detail with reference to FIGS. 5 and 6.

In addition, the curve guidance apparatus 10 may judge the degree of risk of the curve section in which the vehicle is to be driven after a predetermined time when the vehicle drives at current speed, using the determined position at the future time point and speed of the vehicle at a reference time point, which is a current position of the vehicle (S103). A description thereof will be provided in detail with reference to FIG. 7.

Figure 5:
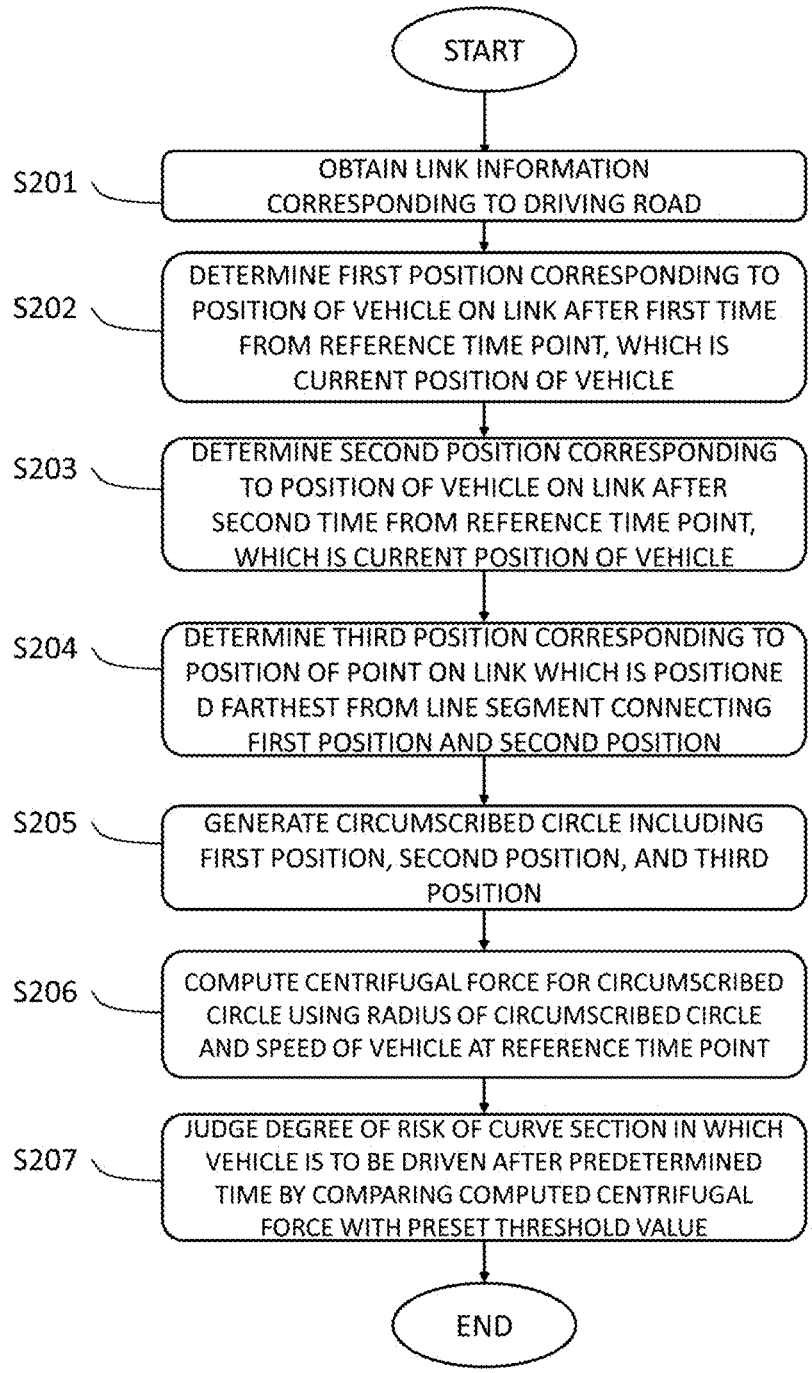
FIG. 5 is a flowchart illustrating a process of computing centrifugal force for a vehicle according to an exemplary embodiment of the present invention.
Figure 6:
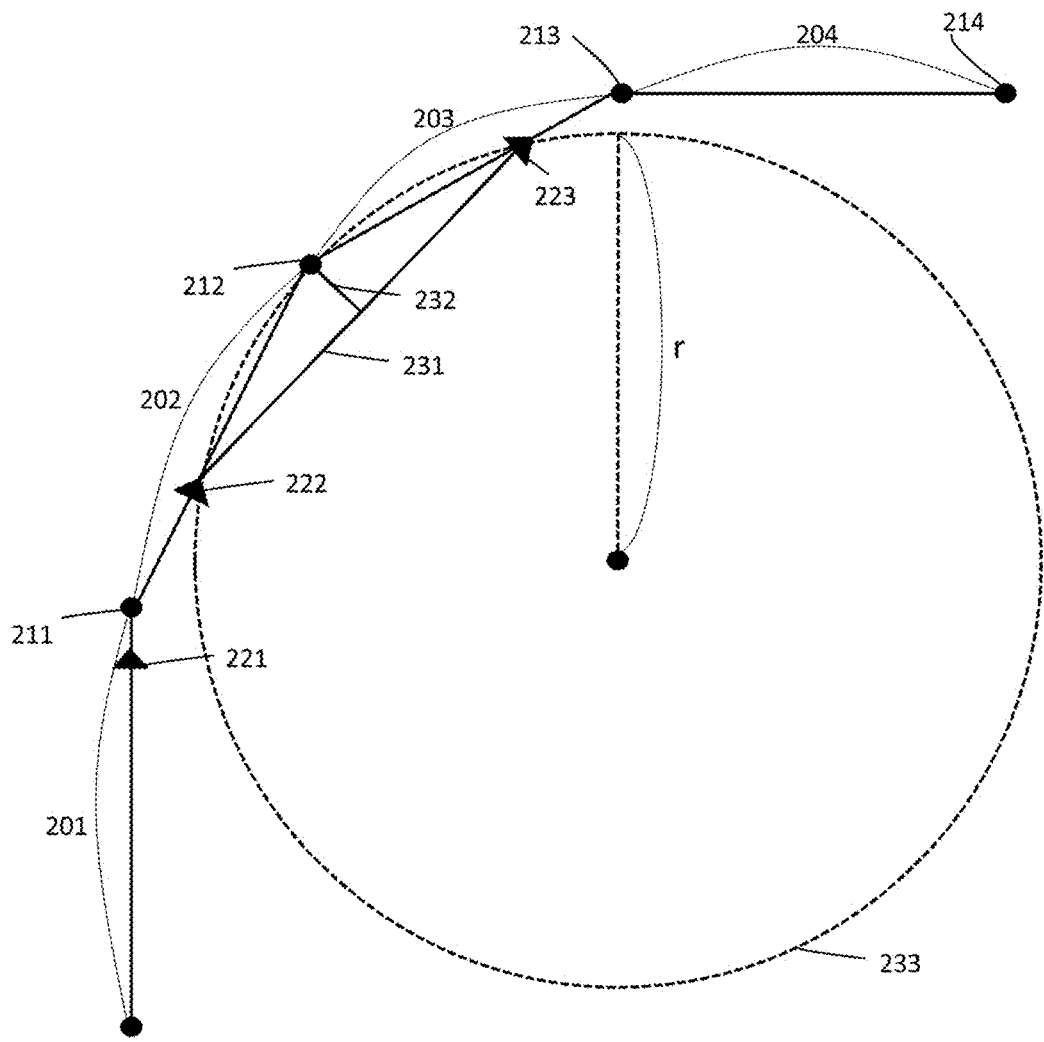
FIG. 6 is a view illustrating a process of computing centrifugal force for a vehicle according to an exemplary embodiment of the present invention.

FIG. 5 is flowchart illustrating a process of computing centrifugal force for a vehicle according to an exemplary embodiment of the present invention. FIG. 6 is a view illustrating a process of computing centrifugal force for a vehicle according to an exemplary embodiment of the present invention. Referring to FIGS. 5 and 6, first, the link information obtaining unit 11 may obtain link information corresponding to a road on which a vehicle is being driven (S201). As an example, as illustrated in FIG. 6, the link information obtaining unit 11 may obtain the link information including at least one of a plurality of links 201, 202, 203, and 204, nodes 211, 212, 213, and 214 connecting each of the plurality of links 201, 202, 203, and 204 to each other, link attribute information on each of the plurality of links, and node attribute information.

One link includes a link start node representing a start point of the link and a link end node representing an end point of the link.

When a vehicle which is not illustrated in FIG. 6 moves on the link 201, the link 202, the link 203, and the link 204 in this order, reference numeral 211 is the start node of the link of reference numeral 202, and reference numeral 212 is the end node of the link of reference numeral 202.

In addition, the link position determining unit 13 may determine a current position 221 of an electronic apparatus or the vehicle in which the electronic apparatus is installed, using a GPS signal.

In addition, the first link position determining unit 13-1 may determine a first position 222 corresponding to a point at which the vehicle is to be positioned at a first time point, which is after a first time from a reference time point 221, which is the current position of the vehicle on the links 201, 202, 203, and 204 of the vehicle (S202).

In addition, the second link position determining unit 13-2 may determine a second position 223 corresponding to a point at which the vehicle is to be positioned at a second time point, which is after a second time from the reference time point, which is the current position of the vehicle on the links 201, 202, 203, and 204 of the vehicle (S203).

That is, the first link position determining unit 13-1 and the second link position determining unit 13-2 may determine the position corresponding to the point at which the vehicle is to be positioned at a future time point on the links 201, 202, 203, and 204 positioned on a moving direction of the vehicle.

Here, the first and second link position determining units 13-1 and 13-2 may compute the first position 222 and the second position 223 using the following Equation 1.

$$S = V*T \qquad \text{[Equation 1]}$$

V is a speed of the vehicle at the reference time point, T is a time, and S is a moving distance.

In this case, the first link position determining unit 13-1 may compute a moving distance after the first time lapses from the current position 221 by reflecting current speed of the vehicle and the first time to Equation 1, and may determine the first position 222 based on the computed moving distance (S202).

In addition, the second link position determining unit 13-2 may compute a moving distance after the second time lapses from the current position 221 by reflecting the current speed of the vehicle and the second time to Equation 1, and may determine the second position 223 based on the computed moving distance (S203).

Meanwhile, the third link position determining unit 13-3 may determine a third position 212 corresponding to a position of a point on a link which is positioned farthest from a line segment 231 connecting the first position and the second position (S204). In the example of FIG. 6, the third link position determining unit 13-3 may measure a perpendicular line distance 232 from the line segment 231 connecting the first position 222 and the second position 223 to a point which exists on the links 201, 202, 203, and 204, and may determine a position of the node 212, which is a position of a point having the longest perpendicular line distance 232 as the third position. Thereafter, the circumscribed circle generating unit 14-1 may generate a circumscribed circle 233 including the first position 222, the second position 223, and the third position 212 (S205).

In addition, the centrifugal force computing unit 14-2 may compute centrifugal force for the circumscribed circle using a radius 'r' of the generated circumscribed circle 233 and the speed of the vehicle at the reference time point (S206). In this case, the centrifugal force computing unit 14-2 may compute the centrifugal force for the circumscribed circle using the following Equation 2.

$$F = \frac{mv^2}{r} \times c \quad \text{[Equation 2]}$$

'r' is the radius of the circumscribed circle, 'm' is mass of the vehicle, 'v' is the speed of the vehicle at the reference time point, 'c' is a value which is preset according to an experimental value by considering various environmental variables such as a road surface state (e.g., a road friction coefficient) of the road, a tire state (e.g., a tire friction coefficient), and the like, and F is the magnitude of centripetal force. The centrifugal force has the same magnitude as the centripetal force, but has only a direction opposite to the centrifugal force.

Here, the mass 'm' of the vehicle may be preset as a preset mass value and may be stored in the storing unit. In addition, 'c' may be preset based on experimental data through the actual road driving test and may be stored in the storing unit. As still another example, in Equation 2, by considering 'm' and 'c' as a constant, it is also possible to calculate F only using values of 'r' and 'v'.

However, according to another implementation, 'm' and 'c' may be set to values which may be changed by an external input. As an example, in a case in which the mass 'm' of the vehicle is input through a user input, a pre-stored 'm' may be updated to 'm' according to the user input. As another example, a server may store optimal values of 'm' and 'c' according to a classification reference such as per model, per period, and the like, and the curve guidance apparatus 10 may periodically communicate with the server to receive the values of 'm' and 'c' to thereby update the pre-stored values of 'm' and 'c' to the values of 'm' and 'c' received from the server. As still another example, 'm' and 'c' may also be obtained from an electronic control unit (ECU) of the vehicle, and may also be provided from a manufacturer of the vehicle.

Accordingly, in a case in which the vehicle drives at the current speed, the centrifugal force computing unit 14-2 may compute the centrifugal force to be applied to the vehicle in the curve section in which the vehicle is to be driven after a predetermined time.

Meanwhile, the degree of risk judging unit 14-4 may judge the degree of risk of the curve section in which the vehicle is to be driven after the predetermined time by comparing the computed centrifugal force with a preset threshold value (S207). In this case, the degree of risk judging unit 14-4 may set a plurality of threshold values and may judge the degree of risk of the curve section according to situations to thereby provide the judged degree of risk to a driver. Such a judgment process will be described in more detail with reference to FIG. 7.

Figure 7:
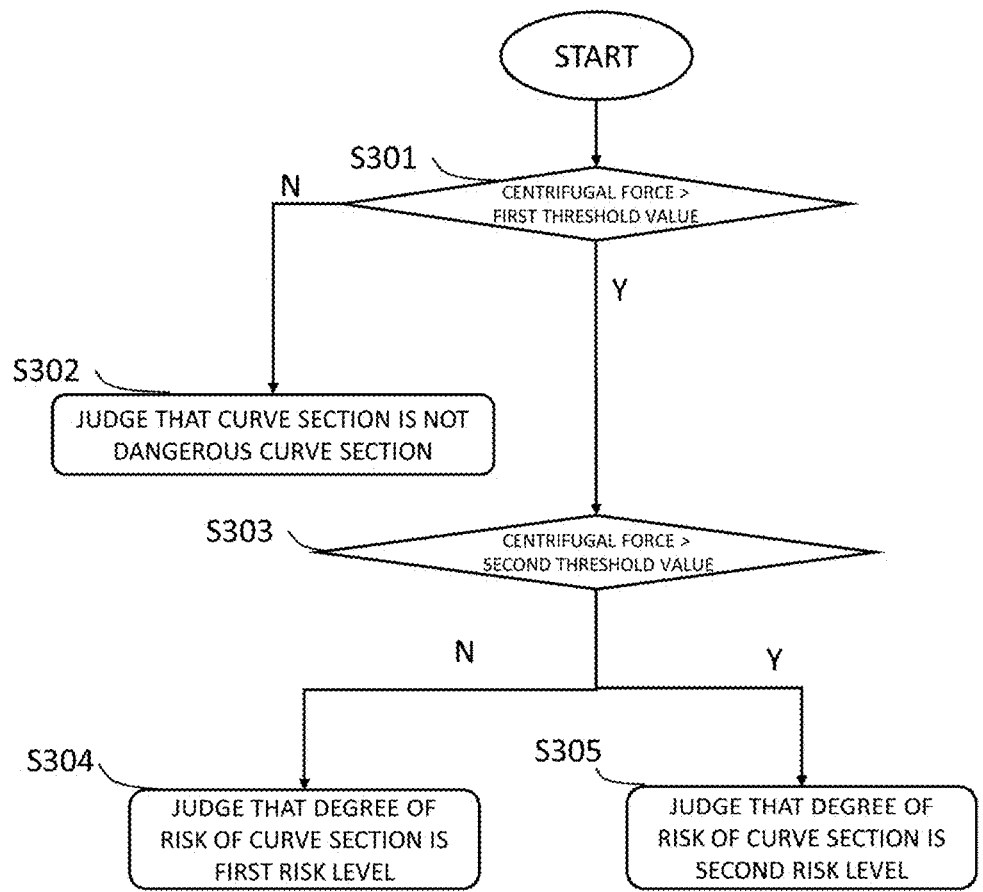
FIG. 7 is a flowchart specifically illustrating a curve guidance method according to an exemplary embodiment of the present invention.

FIG. 7 is a flowchart specifically illustrating a curve guidance method according to an exemplary embodiment of the present invention. Referring to FIG. 7, first, the degree of risk judging unit 14-4 may compare the centrifugal force computed by the centrifugal force computing unit 14-2 with the first threshold value (S301).

If the computed centrifugal force is smaller than the first threshold value (No in S301), the degree of risk judging unit 14-4 may judge that the curve section in which the vehicle is to be driven after the predetermined time is not a dangerous section (S302). As an example, in a case in which the curve section in which the vehicle is to be driven after the predetermined time is a curve section having a small degree of flexure (e.g., a section having a large radius of the circumscribed circle), or in a case in which the current speed of the vehicle is low, the centrifugal force to be applied to the vehicle in the corresponding curve section may be small. In this case, the degree of risk judging unit 14-4 may judge that the road on which the vehicle is to be driven after the predetermined time is not a dangerous curve section.

If the computed centrifugal force is greater than the first threshold value (Yes in S301), the degree of risk judging unit 14-4 may compare the computed centrifugal force with the second threshold value (S303). Here, the second threshold value may be a value greater than the first threshold value.

If the computed centrifugal force is greater than the first threshold value and is smaller than the second threshold value (No in S303), the degree of risk judging unit 14-4 may judge the degree of risk of the curve section in which the vehicle is to be driven after the predetermined time as a first risk level (S304).

If the computed centrifugal force is greater than the second threshold value (Yes in S303), the degree of risk judging unit 14-4 may judge the degree of risk of the curve section in which the vehicle is to be driven after the predetermined time as a second risk level (S305).

Here, the first risk level may be an attention level informing the user that an "attention" will be made for the degree of risk of the curve section of the road on which the vehicle is to be driven, and the second risk level may also be a "warning" level at which an attention having a level higher than the "attention level" is required.

For example, in a case in which the curve section in which the vehicle is to be driven after the predetermined time is a curve section having a large degree of flexure (e.g., a section having a small radius of the circumscribed circle), or in a case in which the current speed of the vehicle is high, the magnitude of the centrifugal force to be applied to the vehicle in the corresponding curve section is measured, such that information such as the "attention" or the "warning" may be provided to the user according to the measured magnitude before the user enters the curve section.

In this case, the degree of risk judging unit 14-4 may judge that the road on which the vehicle is to be driven after the predetermined time is a curve section that requires the attention or the warning according to the comparison between the threshold value and the computed centrifugal force. Of course, in a case in which the computed centrifugal force is smaller than the first threshold value, the degree of risk judging unit 14-4 may judge that a section that the vehicle currently enters is a safe section that does not require the attention or the warning. Of course, even in the safe state, a "safe" indication representing that the road on which the vehicle is to be driven is the safe section may also be output to the driver, and in a case in which it is predefined so that only "attention" and "warning" indications are output to the driver, the "safe" indication may not also be output.

Meanwhile, the first and second threshold values described above may be changed based on the link attribute information. Specifically, the weight computing unit 14-3 may compute a weight for the threshold value based on at least one of the road rank information, the road width information, the information of the number of lanes of the road, and the road slope information of the obtained link information, and may adjust a preset threshold value based on the computed weight. A description thereof will be provided in detail with reference to FIG. 8.

Figure 8A:
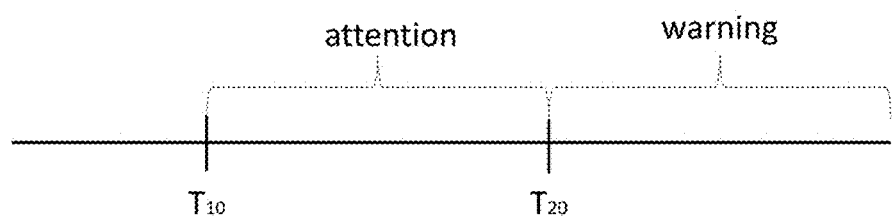
FIGS. 8A to 8C are views illustrating a method for adjusting a threshold value according to an exemplary embodiment of the present invention.
Figure 8B:
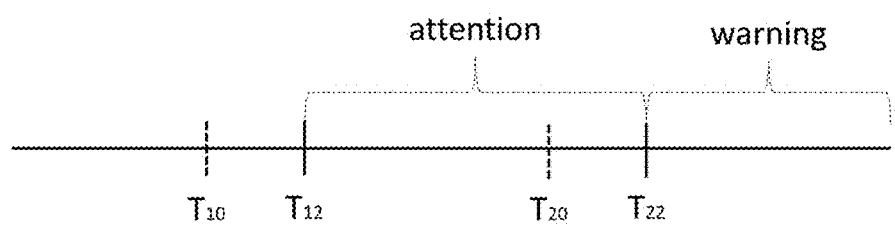
Figure 8C:
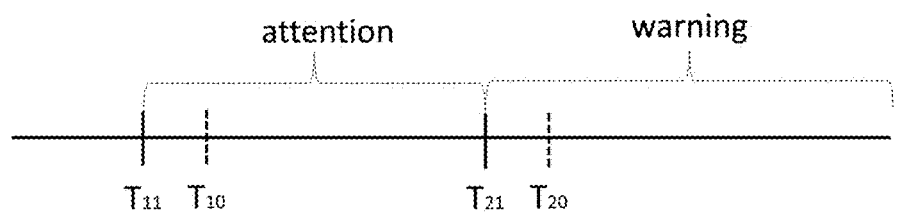

FIGS. 8A to 8C are views illustrating an adjustment of a threshold value according to an exemplary embodiment of the present invention. The degree of risk of the curve section felt by a sensory organ of the user may be varied according to the road rank (e.g., the road is the highway or the general road), the road type, the road width (e.g., information on whether the road width is wide or narrow, or the road width information), the number of lanes of the road (e.g., information on whether the number of lane of the road is large or small, or the information of the number of lanes of the road), the road slope (e.g., whether the road is the uphill road or the downhill road, or superelevation information), and the like.

As an example, in a case in which the number of lanes of the curve section is large, the degree of risk felt by the driver in relation to the curve section will be smaller than a case in which the number of lanes of the curve section is small. In a case in which the number of lanes of the curve section is small, the degree of risk felt by the driver in relation to the curve section will be greater than a case in which the number of lanes of the curve section is large.

As another example, in a case in which the rank of the road to which the curve section belongs is the highway, the degree of risk felt by the driver in relation to the curve section will be smaller than the general road. In contrast, in a case in which the rank of the road to which the curve section belongs is the general road, the degree of risk felt by the driver in relation to the curve section will be greater than the highway.

As still another example, in a case in which the road width of the curve section is wide, the degree of risk felt by the driver in relation to the curve section will be smaller than a case in which the road width of the curve section is narrow. In contrast, in a case in which the road width of the curve section is narrow, the degree of risk felt by the driver in relation to the curve section will be greater than a case in which the road width of the curve section is wide.

As still another example, in a case in which the curve section is on the uphill road, the degree of risk felt by the driver in relation to the curve section will be smaller than a case in which the curve section is on the downhill road. In contrast, in a case in which the curve section is on the downhill road, the degree of risk felt by the driver in relation to the curve section will be greater than a case in which the curve section is on the uphill road.

As still another example, in a case in which the superelevation of the curve section is large, the degree of risk felt by the driver in relation to the curve section will be smaller than a case in which the superelevation of the curve section is small. In contrast, in a case in which the superelevation of the curve section is small, the degree of risk felt by the driver in relation to the curve section will be greater than a case in which the superelevation of the curve section is large.

By reflecting the degree of risk felt by the sensory organ of the user according to the above-mentioned road attributes, the weight computing unit 14-3 may compute the weight as a value less than '1', '1', or a value greater than '1', and may adjust a first threshold value (T10) and a second threshold value (T20) based on the computed weight.

According to two cases described above, in Case 1, the weight computing unit 14-3 computes the weight as '1' or the 'value greater than 1', and in Case 2, the weight computing unit 14-3 computes the weight as the value less than 1', '1', or the value greater than '1'.

Specifically, in a case in which the number of lanes of the curve section is large, a height of the vehicle is low, mass of the vehicle is light, the width of the vehicle is wide, the rank of the road to which the curve section belongs is the highway, the lane width of the curve section is wide, the curve section is on the uphill road, or the superelevation of the curve section is large, the weight computing unit 14-3 may compute the weight as the value greater than '1'.

In addition, in a case in which the number of lanes of the curve section is small, the height of the vehicle is high, the mass of the vehicle is heavy, the width of the vehicle is narrow, the road rank to which the curve section belongs is the general road, the lane width of the curve section is narrow, the curve section is on the downhill road, or the superelevation of the curve section is small, the weight computing unit 14-3 may compute the weight as '1' or the value smaller than '1'.

If the respective situations overlap each other, the weight computing unit 14-3 may compute a final weight by multiplying weights corresponding to the respective situations.

Meanwhile, in a case in which the weight computed by the weight computing unit 14-3 is greater than '1', the first threshold value T10 and the second threshold value T20 may be adjusted to a 1-2-th threshold value T12 and a 2-2-th threshold value T22, respectively. As such, in a case in which new threshold values become greater than preset thresholds, a degree of risk guidance of the curve section may be performed in a driving situation (an increase of current driving speed, etc.) in which prediction centrifugal force to be applied to the vehicle becomes greater than preset centrifugal force (see FIGS. 8A and 8B).

In addition, in a case in which the weight computed by the weight computing unit 14-3 is smaller than '1', the first threshold value T10 and the second threshold value T20 may be adjusted to a 1-1-th threshold value T11 and a 2-1-th threshold value T21, respectively. As such, in a case in which new threshold values become smaller than the preset thresholds, the degree of risk guidance of the curve section may be performed even in a driving situation (a decrease of the current driving speed, etc.) in which the prediction centrifugal force to be applied to the vehicle becomes smaller than preset centrifugal force (see FIGS. 8A and 8C).

Meanwhile, although the exemplary embodiment described above describes the case in which the weight computing unit 14-3 adjusts the preset threshold values by applying the weight to the preset threshold values based on at least one of the road rank information, the road type information, the road width information, the road slope information, and the information of the number of lanes, the present invention is not limited thereto.

According to another exemplary embodiment of the present invention, the weight computing unit 14-3 may adjust a constant value of m*c by computing a second weight for adjusting the constant value of m*c described in Equation 2 based on at least one of the road rank information, the road width information, the road slope information, and the information of the number of lanes, and applying the computed second weight. As an example, in a case in which the number of lanes of the curve section is large, the road rank to which the curve section belongs is the highway, the road width of the curve section is wide, the curve section is on the uphill road, or the superelevation of the curve section is large, the weight computing unit 14-3 may compute the second weight as the value smaller than '1'. In this case, since the centrifugal force computed through Equation 2 becomes smaller than centrifugal force before reflecting the second weight, the degree of risk guidance may not be performed even in an existing situation in which the degree of risk guidance should be performed.

In addition, in a case in which the number of lanes of the curve section is small, the road rank to which the curve section belongs is the general road, the road width of the curve section is narrow, the curve section is on the downhill road, or the superelevation of the curve section is small, the weight computing unit 14-3 may compute the second weight as the value greater than '1'. In this case, since the centrifugal force computed through Equation 2 becomes greater than the centrifugal force before reflecting the second weight, the degree of risk guidance may be performed even in an existing situation in which the degree of risk guidance is not performed.

According to various exemplary embodiments of the present invention, since whether or not the road on which the vehicle is to be driven after the predetermined time is the curve section may be judged in real time using existing retained link information, the curve guidance may be performed without needing the pre-survey for the curve sections across the country, which incurs high cost.

As well, when the degree of risk for the curve section in which the vehicle is to be driven after the predetermined time is guided, since the guidance that a curvature of the curve section and current driving speed of the vehicle are simultaneously considered is provided, the user may more effectively cope with the curve section. As an example, in a case in which because the curvature of the curve section is large, but the vehicle is currently driven at low speed, the vehicle has low possibility that it will be exposed to a risk in the curve section, the degree of risk is not guided, which prevents the driving of the user from being disturbed due to an unnecessary guidance, thereby making it possible to improve safety of the user.

Further, according to various exemplary embodiments of the present invention, the threshold value of the degree of risk guidance is adjusted by reflecting the factors capable of influencing the degree of risk of the curve section which is felt by the sensory organ of the user, for example, the road rank (e.g., the information on whether the road is the highway or the general road), the road width (e.g., information on whether the road width is wide or narrow, or the road width information), the number of lanes of the road (e.g., the information on whether the number of lane of the road is large or small, or the information of the number of lanes of the road), and the road slope (e.g., the road longitudinal slope information or the superelevation information), thereby making it possible to more accurately perform the guidance for the degree of risk of the curve section. For example, among various exemplary embodiments of the present invention, in a case in which the threshold value of the degree of risk guidance is varied according to the road rank, the road rank information may be set so as to have a flag value of '1' in the case of the highway, and a flag value of '0' in the case of the general road.

In addition, in a case in which the threshold value of the degree of risk guidance is varied according to the road width information, the road width information may be set to the flag value of '0' and '1' or may include actual road width information. For example, the road width information may be set so as to have the flag value of '1' in a case in which the road width is wide and the flag value of '0' in a case in which the road width is narrow, or the road width information may be set so as to have the actual road width information such as '1.8 m'.

Further, according various exemplary embodiments of the present invention described above, the degree of risk of the curve section is guided being classified into two steps of an 'attention' and a 'warning', thereby making it possible for the user to more effectively cope with the curve section. Although the present specification describes a case in which the degree of risk is guided being classified into the two steps of the 'attention' and the 'warning', various guides according to the degree of risk of the curve section may be provided to the user by classifying the degree of risk into three or more steps.

Meanwhile, according to the example described above, although it is described that the degree of risk judging unit 14-4 judges the degree of risk of the curve section in which the vehicle is to be driven after the predetermined time by comparing the computed centrifugal force with the preset threshold value, by way of example, the present invention is not limited thereto. According to another embodiment, the degree of risk judging unit 14-4 may judge whether or not the road on which the vehicle is to be driven after the predetermined time is a dangerous curve section when the vehicle is being driven at the current speed, based on a computed flexure angle and the speed of the vehicle at the reference time point. A description thereof will be provided in detail with reference to FIG. 9.

Figure 9:
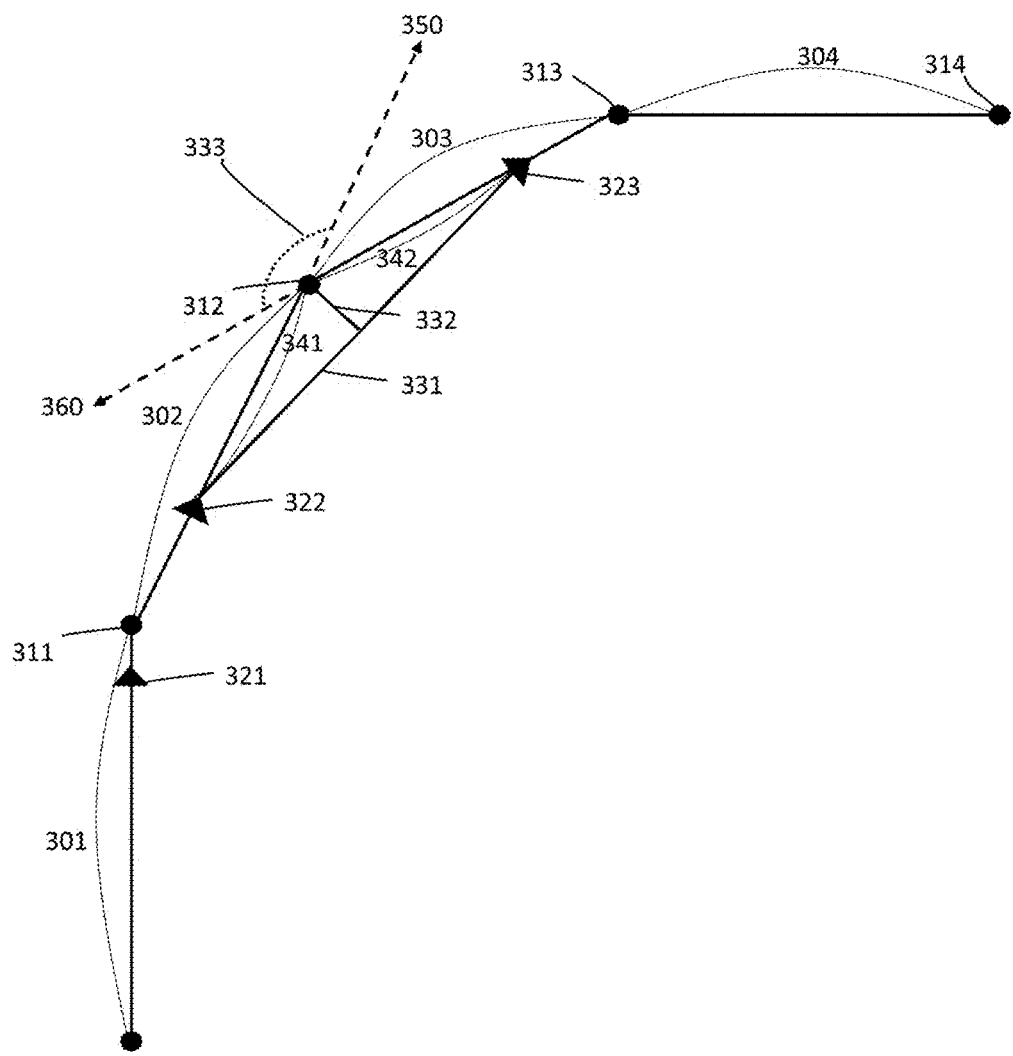
FIG. 9 is a view specifically illustrating a curve guidance method according to another exemplary embodiment of the present invention.

FIG. 9 is a view specifically illustrating a curve judgment method according to another exemplary embodiment of the present invention. As illustrated in FIGS. 5 and 6, the first link position determining unit 13-1 may determine a first position 322 corresponding to a point at which the vehicle is to be positioned at a first time point, which is after a first time from a reference time point 321 on the links 301, 302, 303, and 304 of the vehicle.

In addition, the second link position determining unit 13-2 may determine a second position 323 corresponding to a point at which the vehicle is to be positioned at a second time point, which is after a second time from the reference time point on the links 301, 302, 303, and 304 of the vehicle.

In addition, the third link position determining unit 13-3 may determine a third position corresponding to a position of a point on a link which is positioned farthest from a line segment 331 connecting the first position 322 and the second position 323. In the example of FIG. 9, the third link position determining unit 13-3 may measure a perpendicular line distance 332 from the line segment 331 connecting the first position 322 and the second position 323 to a point which exists on the links 301, 302, 303, and 304, and may determine a position of the node 312, which is a position of a point having the longest perpendicular line distance 332 as the third position.

In addition, an angle computing unit (not shown) may compute an angle 333 formed by an extension line 350 of a line segment 341 connecting the first position 322 and the third position 312, and an extension line 360 of a line segment 342 connecting the second position 323 and the third position 312.

In this case, the degree of risk judging unit 14-4 may judge the degree of risk of the curve section in which the vehicle is to be driven after the predetermined time by comparing the computed angle 333 with a threshold angle corresponding to the speed of the vehicle at the reference time point. For example, in a case in which the computed angle 333 is greater than the threshold angle corresponding to the speed of the vehicle at the reference time point, the degree of risk judging unit 14-4 may judge that the curve section in which the vehicle is to be driven after the predetermined time is not dangerous. However, in a case in which the computed angle 333 is smaller than the threshold angle corresponding to the speed of the vehicle at the reference time point, the degree of risk judging unit 14-4 may judge that the curve section in which the vehicle is to be driven after the predetermined time is dangerous.

In this case, the degree of risk judging unit 14-4 may set a plurality of threshold angles to thereby judge the degree of risk of the curve section as in the above-mentioned examples. Since these configurations are apparent based on the above-mentioned examples, a detailed description thereof will be omitted.

Meanwhile, the curve guidance apparatus 10 according to an exemplary embodiment of the present invention may determine the link position using the curve link corresponding to the link. A description thereof will be provided in detail with reference to FIGS. 10 and 11.

Figure 10:
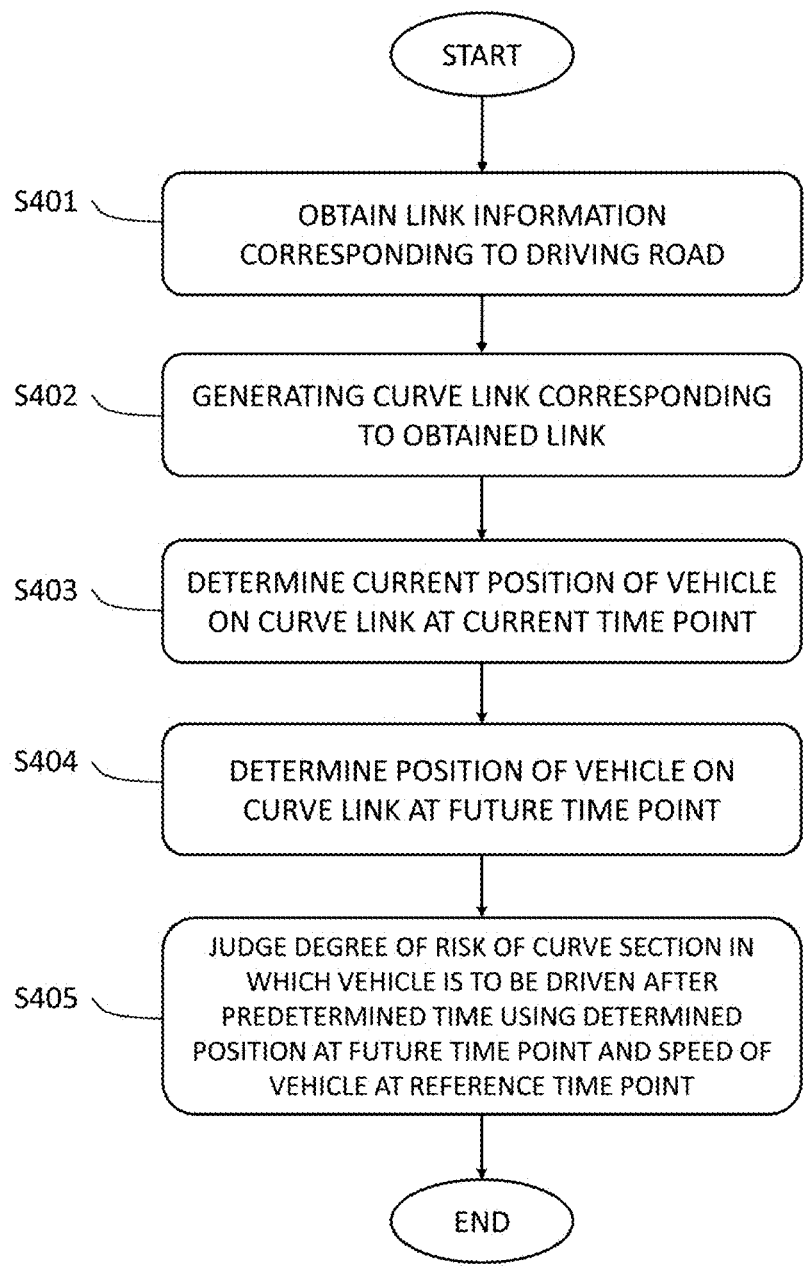
FIG. 10 is a flowchart illustrating a curve guidance method according to another exemplary embodiment of the present invention.
Figure 11:
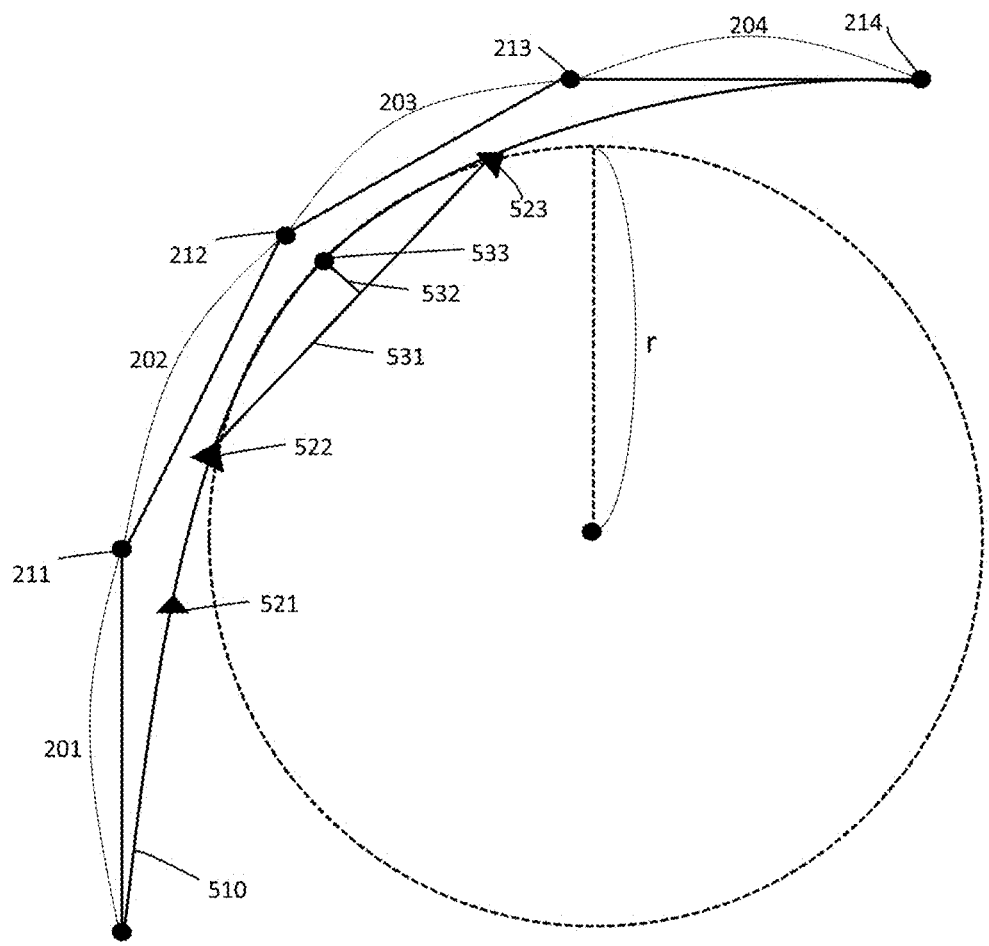
FIG. 11 is a view illustrating a curve link according to another exemplary embodiment of the present invention.

FIG. 10 is a flowchart illustrating a curve guidance method according to another exemplary embodiment of the present invention. FIG. 11 is a view illustrating a curve link according to another exemplary embodiment of the present invention.

Referring to FIGS. 10 and 11, first, the curve guidance apparatus 10 may obtain link information corresponding to a road on which a vehicle is being driven (S401). Specifically, the link information obtaining unit 11 may obtain the link information corresponding to the road on which the vehicle is being driven from map data including a plurality of links for representing roads within many areas.

As an example, as illustrated in FIG. 11, the link information obtaining unit 11 may obtain the link information including at least one of a plurality of links 201, 202, 203, and 204, nodes 211, 212, 213, and 214 connecting each of the plurality of links 201, 202, 203, and 204 to each other, link attribute information on each of the plurality of links, and node attribute information.

In addition, the curve link generating unit 14-7 may generate the curve link corresponding to the link obtained using the curve algorithm such as a Bezier curve algorithm (S402). Specifically, the curve link generating unit 14-7 may generate a curve link 510 corresponding to the plurality of links 201, 202, 203, and 204 using the plurality of links 201, 202, 203, and 204, the nodes 211, 212, 213, and 214 connecting each of the plurality of links 201, 202, 203, and 204 to each other, and a plurality of points included in each of the plurality of links 201, 202, 203, and 204.

In addition, the link position determining unit 13 may determine a current position 521 on the curve link 510 of an electronic apparatus or the vehicle in which the electronic apparatus is installed, using a GPS signal (S403).

In addition, the link position determining unit 13 may determine a position of the vehicle on the curve link at a future time point (S404). Specifically, the first link position determining unit 13-1 may determine a first position 522 corresponding to a point at which the vehicle is to be positioned at a first time point, which is after a first time from the reference time point on the curve link 510. In addition, the second link position determining unit 13-2 may determine a second position 523 corresponding to a point at which the vehicle is to be positioned at a second time point, which is after a second time from the reference time point on the curve link 510 (S203).

In this case, the first and second link position determining units 13-1 and 13-2 may compute the first position 522 and the second position 523 using Equation 1 described above.

Meanwhile, the third link position determining unit 13-3 may measure a perpendicular line distance 532 from a line segment 531 connecting the first position 522 and the second position 523 to a point which exists on the curve link 510, and may determine a position of a point, which is a position of a point having the longest perpendicular line distance 532 as the third position 533.

Meanwhile, the degree of risk judging unit 14-4 may judge the degree of risk of the curve section in which the vehicle is to be driven using the position of the vehicle at the future time point determined by the link position determining unit 13 and the speed of the vehicle at the reference time point (S405). Specifically, the degree of risk judging unit 14-4 may compute centrifugal force applied to the vehicle in the curve section using the plurality of determined positions 522, 523, and 533 and the speed of the vehicle at the current time point, which is the reference time point 521, and may judge the degree of risk of the curve section based on the computed centrifugal force.

According to the present invention described above, the degree of risk of the curve section may be more accurately guided. Specifically, an actual moving path of the vehicle is a curve, but the links are formed in a straight line. Therefore, in a case in which the positions of the links are determined, or the centrifugal force is computed by intactly using the prestored links, data to which actual moving characteristics of the vehicle are reflected is computed, and as a result, an accuracy of the degree of risk guidance may be decreased. However, according to an exemplary embodiment of the present invention, the position of the vehicle at the future time point on the curve link is determined, and the degree of risk of the curve section in which the vehicle is to be driven is judged using the position of the vehicle at the future time point determined on the curve link and the speed of the vehicle at the reference time point, thereby making it possible to more accurately guide the degree of risk of the curve section.

Meanwhile, the link position determining unit 13 may determine the first position by adjusting the first time depending on whether or not the vehicle enters the curve section. A description thereof will be provided in more detail with reference to FIGS. 12A and 12B.

Figure 12A:
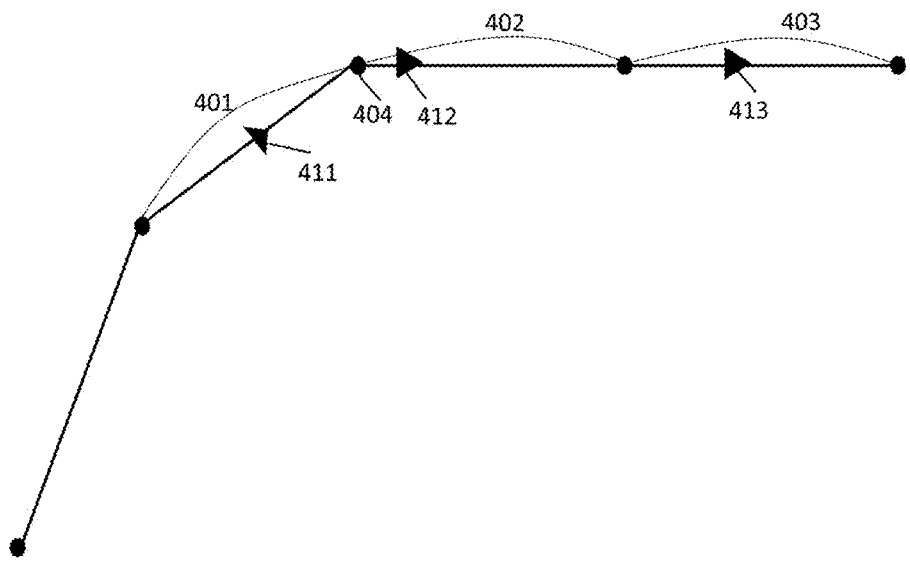
FIGS. 12A and 12B are views illustrating an example of adjusting a first time depending on whether or not a vehicle enters a curve section.

FIG. 12A is a view illustrating a possible problem that may occur when a first time is not adjusted depending on whether or not a vehicle enters a curve section. Referring to FIG. 12A, a current position 411 of the vehicle may be close to a curve end point 404 according to a driving of the vehicle. In this situation, in a case in which the link position determining unit 13 predicts future positions 412 and 413 of the vehicle using a first time and a second time which are preset, the future positions 412 and 413 may be positioned on links 402 and 403 corresponding to a straight line section out of the curve section. In this case, since centrifugal force in the corresponding straight line section is close to zero, the degree of risk judging unit 14-4 may judge that the degree of risk does not exist in the curve section in which the vehicle is to be driven after the predetermined time, and may end curve section guidance.

As a result, this may cause a problem that even if the vehicle is being currently driven in the curve section, the curve section guidance ends, by which a driving assistance function for a driver may not be accurately performed.

Figure 12B:
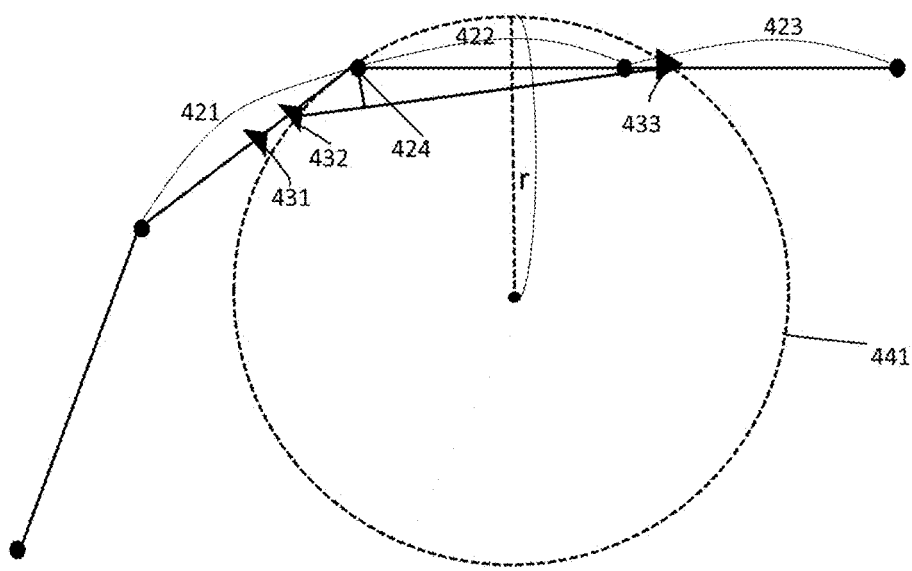

FIG. 12B is a view illustrating an example of adjusting a first time depending on whether or not a vehicle enters a curve section. Referring to FIG. 12B, in a case in which the vehicle enters the curve section and drives therein, the link position determining unit 13 may determine the first position 432 by shortening the first time which is preset. As an example, in a case in which the first time which is preset is 1 second, when the vehicle enters the curve section, the link position determining unit 13 may determine the first position 432 by gradually shortening the first time such as 0.8 seconds, 0.6 seconds, and 0.4 seconds. In this case, a distance difference between the current position 431 of the vehicle and the first position 432, which is a position after the first time, may be decreased. That is, in the case in which the vehicle is being driven in the curve section, the first position 432 may also be positioned on the link 421 corresponding to the curve section.

In this case, since the first position 432 is not positioned on the links 422 and 423 corresponding to the straight line section, a circumscribed circle 441 having a predetermined radius and including the first position 432, the second position 433, and the third position 424 may be formed. In addition, the degree of risk judging unit 14-4 may judge the degree of risk of the curve section in which the vehicle is to be driven after the predetermined time based on the current speed of the vehicle.

According to the exemplary embodiment, the problem that the curve section guidance ends before the vehicle passes through a curve end point (in FIG. 12B, the third position 424 corresponds to the curve end point) may be solved. Meanwhile, in a case in which the vehicle passes through the curve end point 424, the link position determining unit 13-1 may determine the first position by adjusting the first time to an original default value.

Figure 13:
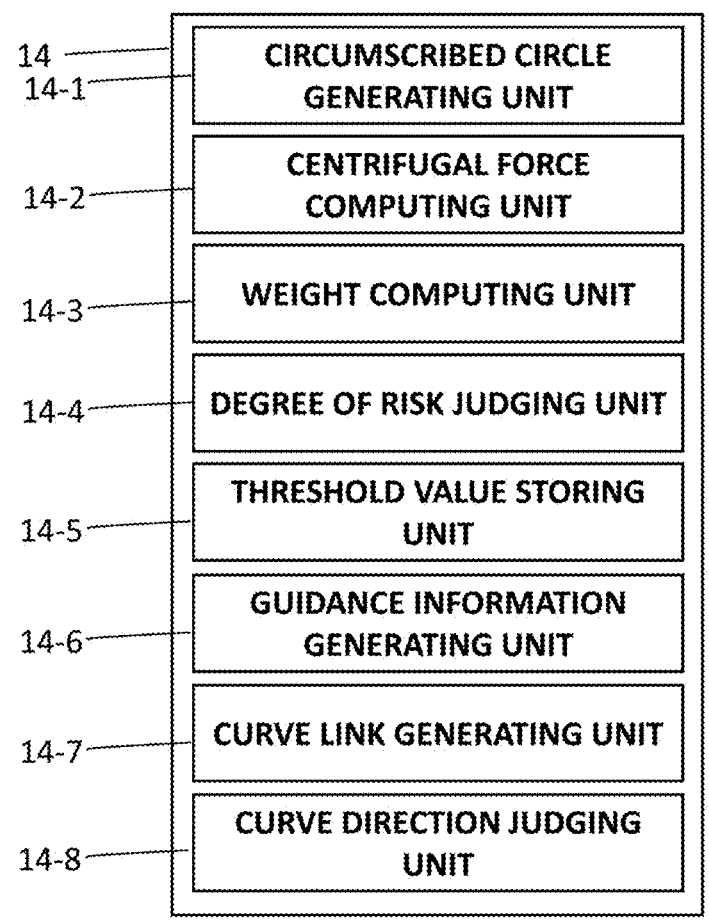
FIG. 13 is a block diagram illustrating a controlling unit according to another exemplary embodiment of the present invention.

Meanwhile, the curve guidance apparatus 10 according to another exemplary embodiment of the present invention may judge a curve direction. A description thereof will be provided in detail with reference to FIGS. 13 and 14. Referring to FIG. 13, the curve guidance apparatus 10 according to another exemplary embodiment of the present invention may include a curve direction judging unit 14-8.

Here, the curve direction judging unit 14-8 may judge whether the curve section in which the vehicle is to be driven after the predetermined time is a left curve or a right curve. More specifically, the curve direction judging unit 14-8 may determine two or more positions of the vehicle on the link at the future time point, may compute vectors directed from the current position of the vehicle toward the two or more determined positions, and may judge whether the curve section in which the vehicle is to be driven after the predetermined time is the left curve or the right curve using direction components of an outer product of the computed vectors. A description thereof will be provided in more detail with reference to FIG. 14.

Figure 14A:
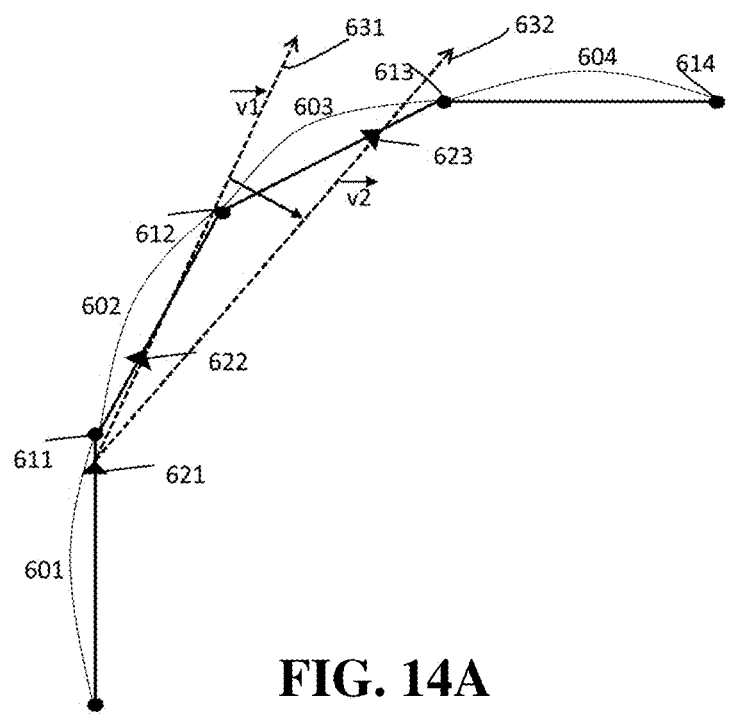
FIGS. 14A and 14B are views illustrating a curve direction judgment method according to an exemplary embodiment of the present invention.
Figure 14B:
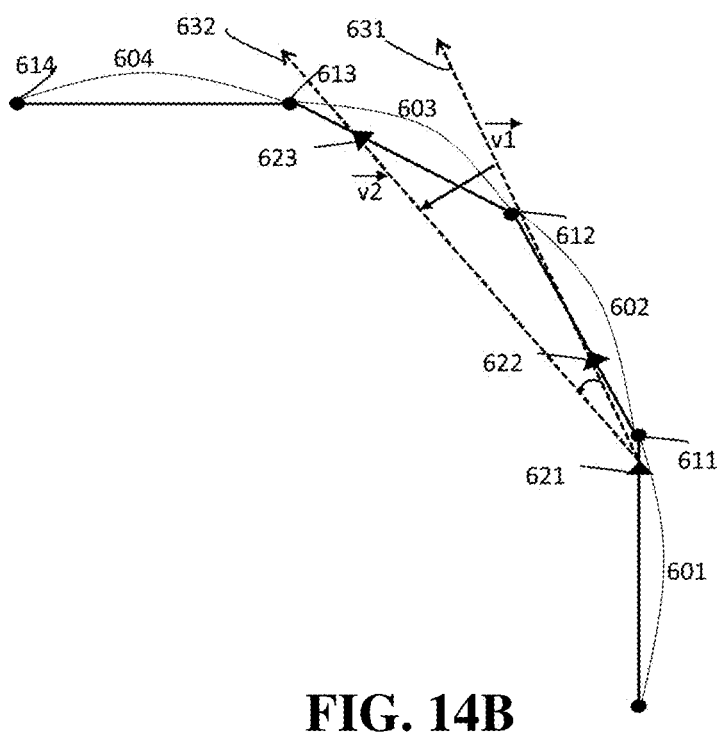

FIGS. 14A and 14B are views illustrating a curve direction judgment method according to an exemplary embodiment of the present invention. Referring to FIG. 14A, the first link position determining unit 13-1 may determine a first position 622 corresponding to a point at which the vehicle is to be positioned at a first time point, which is after a first time from a current position 621 of the vehicle on the links 601, 602, 603, and 604 of the vehicle.

In addition, the second link position determining unit 13-2 may determine a second position 623 corresponding to a point at which the vehicle is to be positioned at a second time point, which is after a second time from the current position 621 of the vehicle on the links 601, 602, 603, and 604 of the vehicle.

In this case, the curve direction judging unit 14-8 may compute a first vector ($\vec{v}_1$) 631 directed from the current position 621 of the vehicle to the first position 622, and may compute a second vector ($\vec{v}_2$) 632 directed from the current position 621 of the vehicle to the second position 623. In addition, the curve direction judging unit 14-8 may perform the outer product of the first vector 631 and the second vector 632 to thereby compute direction components. As an example, as illustrated in FIG. 14A, in a case in which the first vector 631 and the second vector 632 exist on X and Y axes, when the outer product of the first vector 631 and the second vector 632 is performed (Equation: First vector 631×Second vector 632), a direction of the outer product may be a direction of −Z which is perpendicular to the first vector 631 and the second vector 632 according to the right-hand law. In this case, the curve direction judging unit 14-8 may judge the curve section in which the vehicle is to be driven after the predetermined time as the right curve.

However, as illustrated in FIG. 14B, in a case in which the first vector 631 and the second vector 632 are implemented to be bilaterally symmetrical with FIG. 14A, when the outer product of the first vector 631 and the second vector 632 is performed (Equation: First vector 631×Second vector 632), the direction of the outer product may be a direction of +Z which is perpendicular to the first vector 631 and the second vector 632 according to the right-hand law. In this case, the curve direction judging unit 14-8 may judge the curve section in which the vehicle is to be driven after the predetermined time as the left curve.

Further, the curve guidance apparatus 10 may be implemented as one module of the electronic apparatus 100 to perform a curve guidance function. A description thereof will be provided in more detail with reference to FIGS. 15 to 17B.

Figure 15:
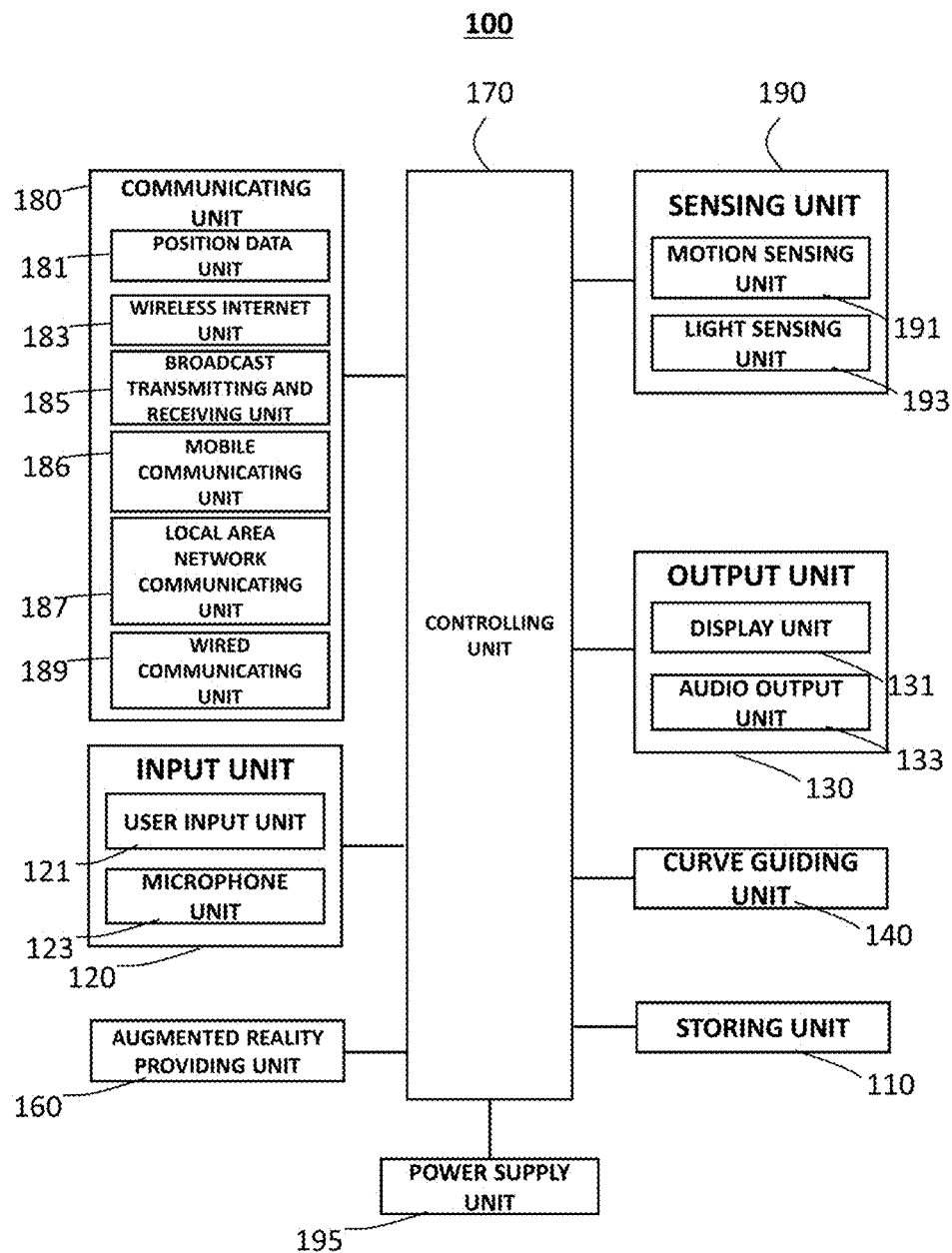
FIG. 15 is a block diagram illustrating an electronic apparatus according to an exemplary embodiment of the present invention.

FIG. 15 is a block diagram illustrating an electronic apparatus according to an exemplary embodiment of the present invention. Referring to FIG. 15, the electronic apparatus 100 includes all or some of a storing unit 110, an input unit 120, an output unit 130, a curve guiding unit 140, an augmented reality providing unit 160, a controlling unit 170, a communicating unit 180, a sensing unit 190, and a power supply unit 195.

Here, the electronic apparatus 100 may be implemented as various apparatuses such as a smartphone, a table computer, a notebook computer, a personal digital assistant (PDA), a portable multimedia player (PMP), a smart glass, a project glass, a navigation, a car dash cam or a car video recorder, which is an image photographing apparatus for a vehicle, capable of providing a driving related guidance to a driver of the vehicle, and may be included in the vehicle.

The driving related guidance may include a variety of guidance for assisting drivers of driving vehicles, such as a path guidance, a lane departure guidance, a lane keeping guidance, a front vehicle starting guidance, a traffic light change guidance, a front vehicle collision prevention guidance, a road change guidance, a road guidance, a curve guidance, and the like.

Here, the path guidance may include an augmented reality path guidance that performs the path guidance by incorporating a variety of information such as a location, a direction, and the like of the user to an image obtained by photographing a front of the vehicle which is being driven, and a 2-dimensional (2D) or 3-dimensional (3D) path guidance that performs the path guidance by incorporating a variety of information such as the location, the direction, and the like of the user to 2D or 3D map data.

As well, the path guidance may include an air map path guidance that performs the path guidance by incorporating a variety of information such as the location, the direction, and the like of the user to air map data. Here, the path guidance may be construed as a concept including the path guidance when the user moves while walking or running, as well as when the user drives the vehicle on board.

In addition, the lane departure guidance refers to guiding whether or not the vehicle which is being driven departs from the lane.

In addition, the lane keeping guidance refers to guiding the vehicle to return to a lane on which the vehicle is originally being driven.

In addition, the front vehicle starting guidance may refer to informing of whether or not a vehicle located in the front of a vehicle which was stopped starts.

In addition, the traffic light change guidance may refer to informing of whether or not a signal of a traffic light located at the front of the vehicle which was stopped is changed. As one example, the traffic light change guidance may refer to informing of a case in which the traffic light is changed from a state in which a red traffic light indicating a stop signal is turned on to a blue traffic light indicating a start signal.

In addition, the front vehicle collision prevention guidance may refer to informing that a distance between one vehicle which was stopped or driven and another vehicle located at the front thereof becomes within a predetermined distance, in order to prevent a collision with the front vehicle when the distance between the two vehicles becomes within the predetermined distance.

In addition, the road change guidance may refer to guiding a driver to change from a road on which the vehicle is located to another road in order to perform the path guidance up to the destination.

In addition, the road guidance may refer to guiding a driver to keep on a road on which the vehicle is currently located.

In addition, the curve guidance may refer to informing that a road on which the vehicle is to be driven after a predetermined time is a curve.

A driving related image such as a front image of the vehicle enabling the provision of the variety of guidance described above may be photographed by a camera held onto the vehicle or a camera of the smartphone. Here, the camera may be formed integrally with the electronic apparatus 100 held on the vehicle to photograph the front of the vehicle.

As another example, the camera may be installed on the vehicle separately from the electronic apparatus 100 to photograph the front of the vehicle. In this case, the camera may be a separate image photographing apparatus for a vehicle held toward the front of the vehicle, and the electronic apparatus 100 may receive the photographed image via wired/wireless communications with the image photographing apparatus for a vehicle held separately from the electronic apparatus 100, or when a storage medium storing the photographed image of the image photographing apparatus for a vehicle is inserted into the electronic apparatus 100, the electronic apparatus 100 may receive the photographed image.

Hereinafter, the electronic apparatus 100 according to an exemplary embodiment of the present invention will be further described in more detail in addition to the description above.

The storing unit 110 serves to store a variety of data and applications that are required to operate the electronic apparatus 100. Specifically, the storing unit 110 may store the data that is required to operate the electronic apparatus 100, for example, an operating system (OS), a path search application, map data, and the like. In addition, the storing unit 110 may store the data generated by the operation of the electronic apparatus 100, for example, searched path data, a received image, and the like.

The storing unit 110 may be implemented as an embedded type of storage element such as a random access memory (RAM), a flash memory, a read only memory (ROM), an erasable programmable ROM (EPROM), an electronically erasable and programmable ROM (EEPROM), a register, a hard disk, a removable disk, a memory card, a universal subscriber identity module (USIM), or the like, as well as a removable type of storage element such as a USB memory, or the like.

The input unit 120 serves to convert a physical input from the outside of the electronic apparatus 100 into a specific electrical signal. Here, the input unit 120 may include all or some of a user input unit 121 and a microphone unit 123.

The user input unit 121 may receive a user input such as a touch, a push operation, or the like. Here, the user input unit 121 may be implemented using at least one of a form of various buttons, a touch sensor receiving a touch input, and a proximity sensor receiving an approaching motion.

The microphone unit 123 may receive voice of the user and sound generated from inside and outside of a vehicle.

The output unit 130 is an apparatus that outputs the data of the electronic apparatus 100 to the user as the image and/or the voice. Here, the output unit 130 may include all or some of a display unit 131 and an audio output unit 133.

The display unit 131 is an apparatus that outputs the data which may be visually cognizable to the user. The display unit 131 may be implemented as the display unit provided to a front surface of a housing of the electronic apparatus 100. In addition, the display unit 131 may be formed integrally with the electronic apparatus 100 to output visual recognition data, and may also be installed separately from the electronic apparatus 100 such as a head up display (HUD) to output the visual recognition data.

The audio output unit 133 is an apparatus that outputs data which may be acoustically recognized by the electronic apparatus 100. The audio output unit 133 may be implemented as a speaker that represents data to be informed to the user of the electronic apparatus 100 as sound.

The curve guiding unit 140 may perform the function of the curve guidance apparatus 10 as described above. Specifically, the curve guiding unit 140 may obtain link information corresponding to a road on which a vehicle is being driven, may determine a position of the vehicle on a link at a future time point, and judge a degree of risk of a curve section in which the vehicle is to be driven after a predetermined time using the determined position of the vehicle and speed of the vehicle at a reference time point.

The augmented reality providing unit 160 may provide an augmented reality view mode. Here, an augmented reality may be a method of visually overlapping additional information (e.g., a graphic element representing a point of interest (POI), a graphic element guiding a curve, a variety of additional information for assisting a safe driving of a driver, and the like) on a screen displaying a real time image which is being viewed by the user to provide the overlapped screen.

Further, this augmented reality providing unit 160 may include all or some of a calibration unit, a 3D space generating unit, an object generating unit, and a mapping unit.

The calibration unit may perform a calibration for estimating a camera parameter corresponding to the camera from the photographed image photographed by the camera. Here, the camera parameter, which is a parameter including a camera matrix, which is information representing a relationship that an actual image is focused on a photograph, may include camera extrinsic parameters and camera intrinsic parameters.

The 3D space generating unit may generate a virtual 3D space based on the photographed image by the camera. Specifically, the 3D space generating unit may generate the virtual 3D space by applying the camera parameter estimated by the calibration unit to a 2D photographed image.

The object generating unit may generate an object for guidance on the augmented reality, for example, a path guidance object, a road change guidance object, a lane departure guidance object, a curve guidance object, and the like.

The mapping unit may map the object generated by the object generating unit to the virtual 3D space generated by the 3D space generating unit. Specifically, the mapping unit may determine a position in the virtual 3D space of the object generated by the object generating unit, and may perform the mapping of the object to the determined position.

Furthermore, the communicating unit 180 may be provided so that the electronic apparatus 100 communicates with other devices. The communicating unit 180 may include all or some of a position data unit 181, a wireless internet unit 183, a broadcast transmitting and receiving unit 185, a mobile communicating unit 186, a local area network communicating unit 187, and a wired communicating unit 189.

The position data unit 181 is an apparatus that obtains position data through a global navigation satellite system (GNSS). The GNSS means a navigation system capable of calculating a position of a receiving terminal using a radio signal received from a satellite. Detailed examples of the GNSS may include a global positioning system (GPS), Galileo, a global orbiting navigational satellite system (GLONASS), COMPASS, an Indian regional navigational satellite system (IRNSS), a quasi-zenith satellite system (QZSS), and the like, depending on an operator thereof. The position data unit 181 of the electronic apparatus 100 according to an exemplary embodiment of the present invention may obtain position data by receiving a GNSS signal serviced in an area in which the electronic apparatus 100 is used. Alternatively, the position data unit 181 may also obtain the position data through communications with a base station or an access point (AP) other than the GNSS.

The wireless internet unit 183 is an apparatus connected to the wireless Internet to obtain or transmit data. The wireless internet unit 183 may be connected to an Internet network through various communication protocols defined so as to perform transmission and reception of wireless data of wireless the LAN (WLAN), wireless broadband (Wibro), world interoperability for microwave access (Wimax), and high speed downlink packet access (HSDPA).

The broadcast transmitting and receiving unit 185 is an apparatus that transmits and receives a broadcast signal through a variety of broadcast systems. Examples of the broadcast systems which may perform transmission and reception through the broadcast transmitting and receiving unit 185 may include the digital multimedia broadcasting terrestrial (DMBT), digital multimedia broadcasting satellite (DMBS), media forward link only (MediaFLO), digital video broadcast handheld (DVB-H), integrated services digital broadcast-terrestrial (ISDBT), and the like. The broadcast signals transmitted and received through the broadcast transmitting and receiving unit 185 may include traffic data, living data, and the like.

The mobile communicating unit 186 may be connected to a mobile communication network according to various mobile communication standards such as 3rd generation (3G), 3rd generation partnership project (3GPP), Long Term Evolution (LTE), and the like to perform voice and data communications.

The local area network communicating unit 187 is an apparatus for local area communications. The local area network communicating unit 187 may communicate through Bluetooth, radio frequency identification (RFID), infrared data association (IrDA), ultra wideband (UWB), ZigBee, near field communication (NFC), wireless-fidelity (WiFi), or the like, as described above.

The wired communicating unit 189 is an interface apparatus capable of connecting the electronic apparatus 100 to other devices by wire. The wired communicating unit 189 may be a USB module capable of performing communication through a USB port.

Further, the communicating unit 180 may communicate with other devices using at least one of the position data unit 181, the wireless internet unit 183, the broadcast transmitting and receiving unit 185, the mobile communicating unit 186, the local area network communicating unit 187, and the wired communicating unit 189.

As an example, in the case in which the electronic apparatus 100 does not include a camera function, the communicating unit 180 may receive an image photographed by the image photographing apparatus for a vehicle such as a car dash cam or a car video recorder, using at least one of the local area network communicating unit 187 and the wired communicating unit 189.

As another example, in the case in which the communicating unit 180 communicates with a plurality of devices, it can communicate with any one of the plurality of devices through the local area network communicating unit 187, and with another of the plurality of devices through the wired communicating unit 189.

The sensing unit 190 is an apparatus capable of sensing a current state of the electronic apparatus 100. The sensing unit 190 may include all or some of a motion sensing unit 191 and a light sensing unit 193.

The motion sensing unit 191 may sense a motion of the electronic apparatus 100 on a 3 dimensional space. The motion sensing unit 191 may include a tri-axis geomagnetic sensor and a tri-axis acceleration sensor. A more accurate trajectory of the vehicle to which the electronic apparatus 100 is attached may be computed by incorporating kinetic data obtained by the motion sensing unit 191 to the position data obtained by the position data unit 181.

The light sensing unit 193 is an apparatus that measures illuminance around the electronic apparatus 100. A brightness of the display unit 131 may be changed so as to correspond to an ambient brightness, using illuminance data obtained by the light sensing unit 193.

The power supply unit 195 is an apparatus that supplies power required to operate the electronic apparatus 100 or operate other devices connected to the electronic apparatus 100. The power supply unit 195 may be an apparatus that receives power from a battery embedded in the electronic apparatus 100 or an external power supply such as a vehicle. In addition, the power supply unit 195 may be implemented as a wired communicating module 119, or may also be implemented as an apparatus that wirelessly receives the power, depending on a form receiving the power.

The controlling unit 170 may control a general operation of the electronic apparatus 100. Specifically, the controlling unit 170 may control all or some of the storing unit 110, the input unit 120, the output unit 130, the curve guiding unit 140, the augmented reality providing unit 160, the communicating unit 180, the sensing unit 190, and the power supply unit 195.

In particular, the controlling unit 170 may obtain link information corresponding to the road on which the vehicle is to be driven later. Here, the link information may be obtained from path guidance data for path guidance up to a destination.

As an example, if destination information is input through the input unit 120, the controlling unit 170 may generate the path guidance data up to the destination using the map data which is pre-stored in the storing unit 110. Alternatively, if the destination information is input through the input unit 120, the controlling unit 170 may transmit a path guidance request including at least one of current position information and the destination information to a server. In addition, the controlling unit 170 may receive the path guidance data from the server according to the path guidance request. In this case, the controlling unit 170 may obtain the link information corresponding to the road on which the vehicle is being driven from the path guidance data.

In addition, if driving prediction path information of the vehicle is generated based on real-time position information of the vehicle, the controlling unit 170 may obtain the link information based on the obtained driving prediction path information.

Meanwhile, the controlling unit 170 may determine a position of the vehicle on the link after predetermined time from the reference time point, and may judge whether or not the road on which the vehicle is to be driven after the predetermined time is a dangerous curve in a case in which the vehicle is driven at current speed, using the determined position and speed of the vehicle at the reference time point. In this case, the controlling unit 170 may use the judgment processes of FIGS. 1 to 7.

In addition, the controlling unit 170 may control the output unit 130 so as to output the curve guidance according to the judgment result. If a degree of risk of a curve is a first risk level, the controlling unit 170 may control the output unit 130 so as to output a first curve section guidance. Here, the first risk level may be a numerical value representing that the curve section is a curve requiring user attention.

If the degree of risk of the curve is a second risk level, the controlling unit 170 may control the output unit 130 so as to output a second curve section guidance. Here, the second risk level may be a numerical value representing that the curve section is a curve requiring a higher attention (warning) of the user.

If the degree of risk of the curve is lower than the first risk level, the controlling unit 170 may control the output unit 130 so as not to output the curve guidance.

In addition, the controlling unit 170 may classify the degree of risk of the curve into three or more steps to thereby provide the curve risk guidance suitable for a situation for each of the steps to the user.

Further, the curve guidance may be performed within an augmented reality screen. Specifically, the augmented reality providing unit 160 may generate a curve guidance object and map the generated curve guidance object to the virtual 3D space to thereby generate the augmented reality screen, and the controlling unit 170 may control the display unit 131 so as to display the generated augmented reality screen.

Figure 16:
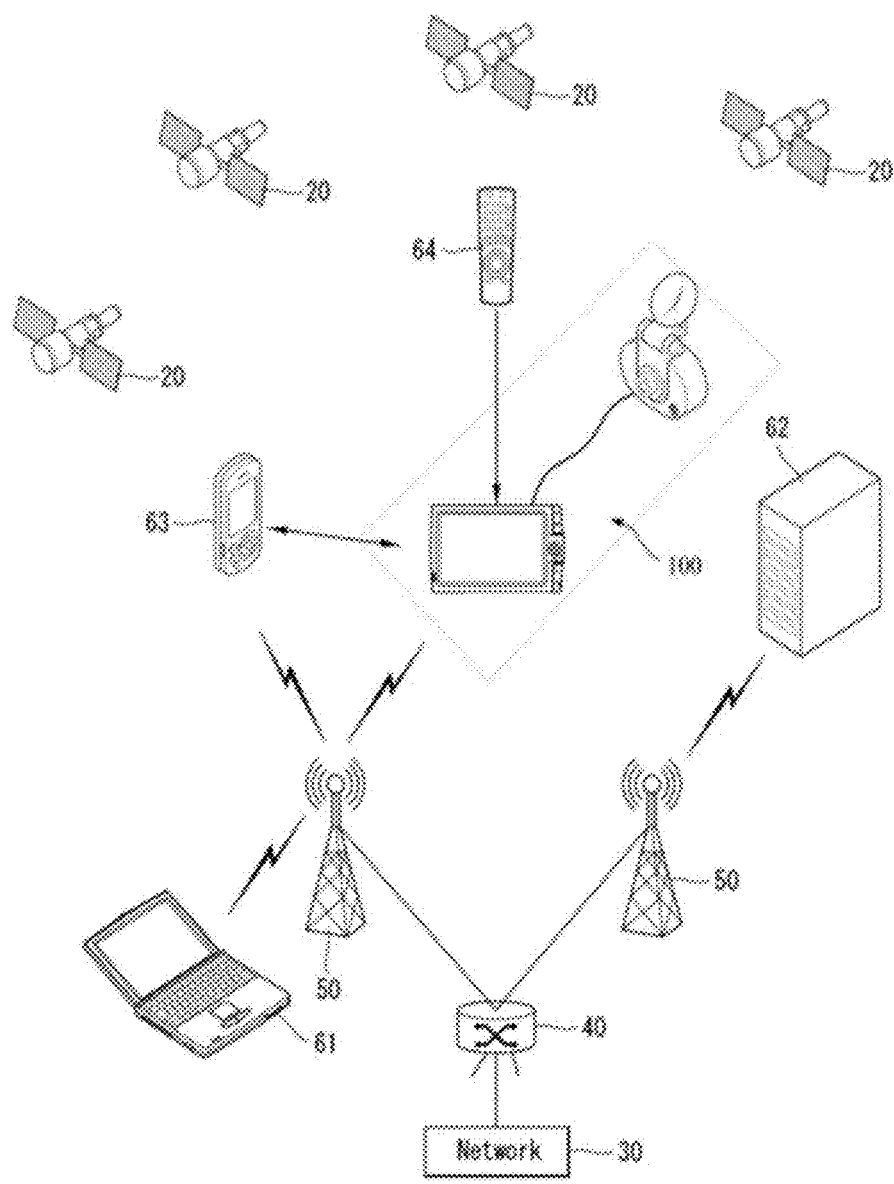
FIG. 16 is a view illustrating a system network connected to the electronic apparatus according to an exemplary embodiment of the present invention.

FIG. 16 is a view illustrating a system network connected to the electronic apparatus according to an exemplary embodiment of the present invention. Referring to FIG. 16, the electronic apparatus 100 according to an exemplary embodiment of the present invention may be implemented as a variety of apparatuses included in the vehicle such as a navigation, an image photographing apparatus for a vehicle, a smartphone, other augmented reality interface providing apparatuses for a vehicle, and the like, and may be connected to various communication networks and other electronic devices 61 to 64.

In addition, the electronic apparatus 100 may be interworked with the GPS module according to radio signals received from satellites 20 to compute a current position thereof and a current time zone thereof.

The respective satellites 20 may transmit L-band frequencies having different bands. The electronic apparatus 100 may compute the current position thereof based on a time that the L-band frequencies transmitted from the respective satellites 20 take to arrive at the electronic apparatus 100.

Meanwhile, the electronic apparatus 100 may be wirelessly connected to a controller station 40 (ACR) through the communicating unit 180 and to a network (30) through a base station 50 (RAS), an access point (AP), or the like. When the electronic apparatus 100 is connected to the network 30, the electronic apparatus 100 may be indirectly connected to other electronic devices 61 and 62 connected to the network 30 to exchange data with other electronic devices 61 and 62.

Meanwhile, the electronic apparatus 100 may also be indirectly connected to the network 30 through another device 63 having a communication function. For example, in the case in which the electronic apparatus 100 does not include a module capable of being connected to the network 30, the electronic apparatus 100 may communicate with another device 63 having the communication function through a local area network communication module, or the like.

Figure 17A:
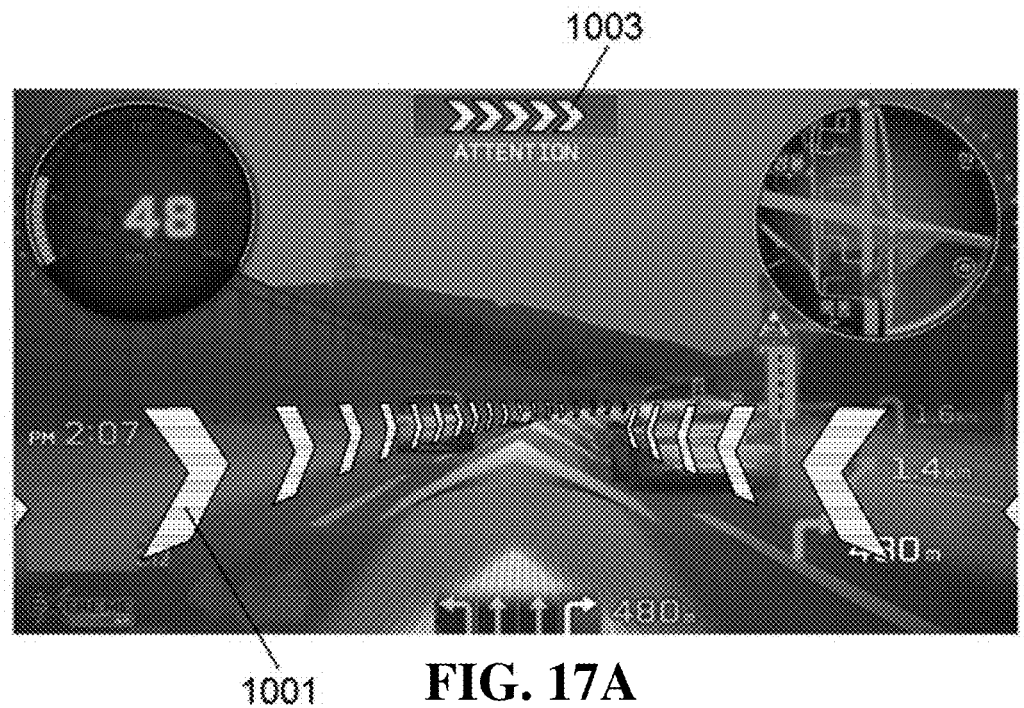
FIGS. 17A and 17B are views illustrating a curve guidance screen of the electronic apparatus according to an exemplary embodiment of the present invention.
Figure 17B:
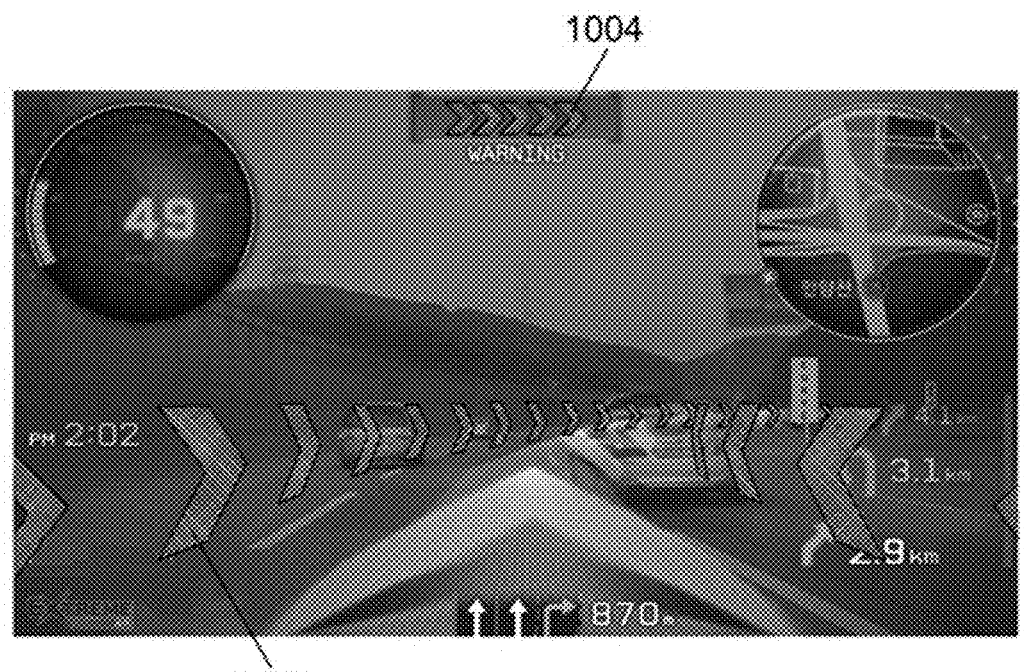

FIGS. 17A and 17B are views illustrating a curve guidance screen of the electronic apparatus according to an exemplary embodiment of the present invention. FIG. 17A is a view illustrating a curve section guidance screen in a case in which the degree of risk of a curve is the first risk level. Referring to FIG. 17A, the electronic apparatus 100 may generate first curve section guidance objects 1001 and 1003 representing the degree of risk of the first risk level, and may output the generated first curve section guidance objects 1001 and 1003 through the augmented reality.

Meanwhile, FIG. 17B is a view illustrating a curve section guidance screen in a case in which the degree of risk of a curve is the second risk level. Referring to FIG. 17B, the electronic apparatus 100 may generate second curve section guidance objects 1002 and 1004 representing the degree of risk of the second risk level, and may output the generated second curve section guidance objects 1002 and 1004 through the augmented reality.

Here, the first curve section guidance objects 1001 and 1003 may be the objects informing that the curve section is a curve requiring user attention. That is, the first curve section guidance may be attention guidance for informing a risk that the vehicle deviates from the road of the curve section when the vehicle passes through the curve section.

The second curve section guidance objects 1002 and 1004 may be the objects informing that the curve section is a curve requiring a higher attention of the user. That is, the second curve section guidance may be a warning guidance for informing a turnover risk of the vehicle that will pass through the curve section.

Therefore, the first curve section guidance objects 1001 and 1003 and the second curve section guidance objects 1002 and 1004 may be implemented so as to be distinguished from each other by different shapes, colors, or the like.

Meanwhile, the first curve section guidance objects 1001 and 1003 and the second curve section guidance objects 1002 and 1004 may be displayed along an area on which a self-vehicle is driven among road areas of the augmented reality screen. In addition, the first curve section guidance objects 1001 and 1003 and the second curve section guidance objects 1002 and 1004 may be implemented by a texture image to be displayed through the augmented reality. Accordingly, the driver may easily recognize the road on which the self-vehicle is being driven.

In addition, the electronic apparatus 100 may also output the first curve section guidance objects 1001 and 1003 and the second curve section guidance objects 1002 and 1004 through voice.

Figure 18:
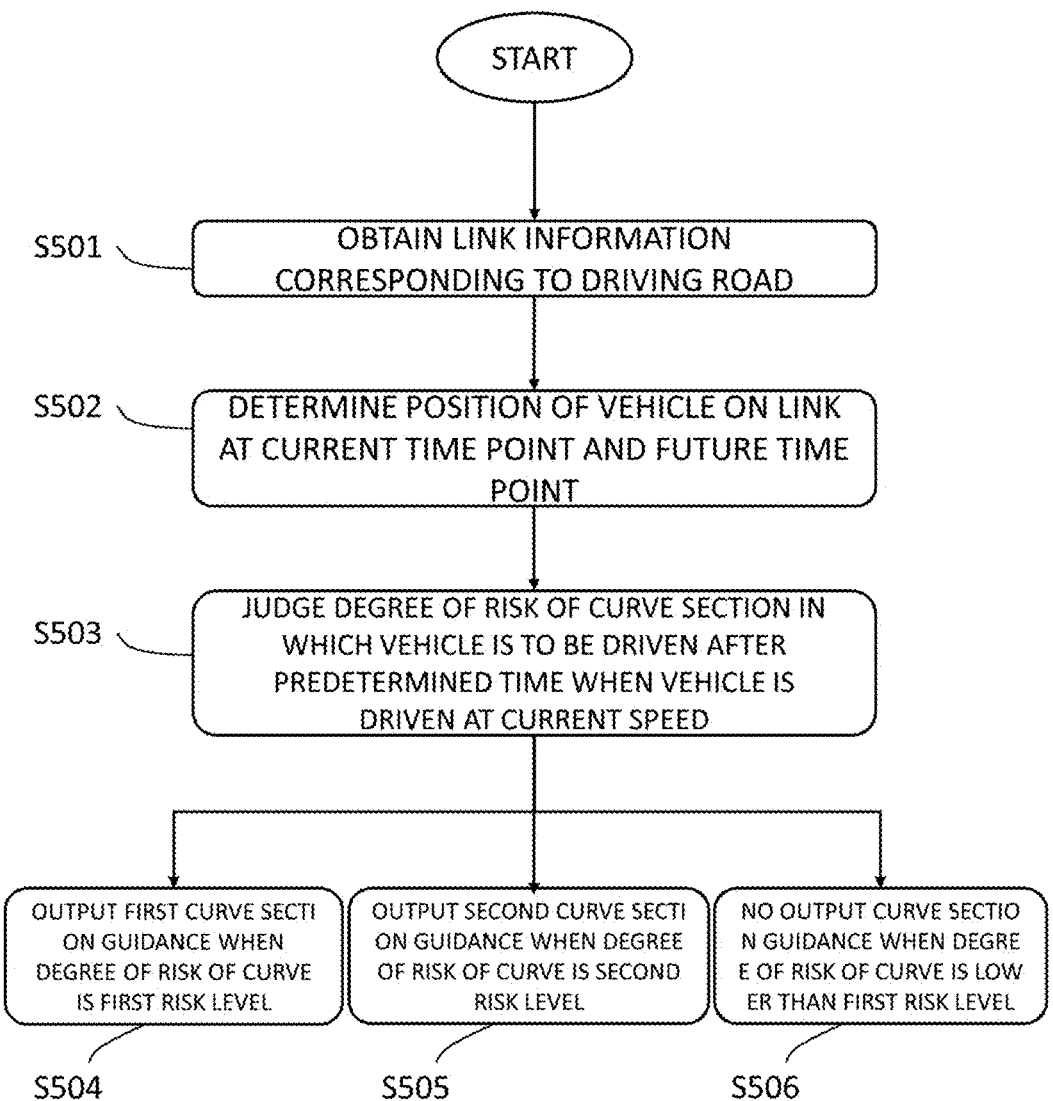
FIG. 18 is a flowchart illustrating a curve guidance method of an electronic apparatus according to an exemplary embodiment of the present invention.

FIG. 18 is a flowchart illustrating a curve guidance method of an electronic apparatus according to an exemplary embodiment of the present invention. Referring to FIG. 18, first, the electronic apparatus 100 may obtain link information corresponding to a road on which a vehicle is to be driven later (S501). Here, the link information may be obtained from path guidance data for path guidance up to a destination. Alternatively, the link information may be obtained based on information on prediction path on which a driving of the vehicle is predicted.

In addition, the electronic apparatus 100 may determine a position of the vehicle on the link at a current time point and a future time point (S502).

In addition, the electronic apparatus 100 may judge the degree of risk of the curve section in which the vehicle is to be driven after a predetermined time when the vehicle drives at current speed, using the determined position at the future time point and speed of the vehicle at a reference time point, which is the current time point (S503). In this case, the controlling unit 170 may use the judgment processes of FIGS. 1 to 14.

If the degree of risk of a curve is the first risk level, the electronic apparatus 100 may output the first curve section guidance (S504).

If the degree of risk of the curve is the second risk level, the electronic apparatus 100 may output the second curve section guidance (S505).

If the degree of risk of the curve is lower than the first risk level, the electronic apparatus 100 may not output the curve section guidance (S506).

Figure 19:
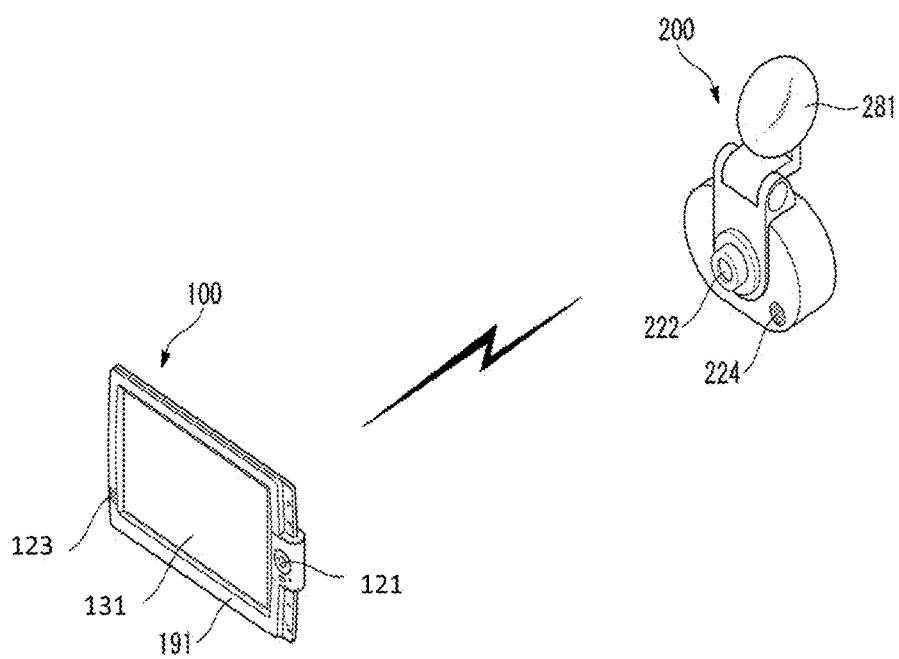
FIG. 19 is a view illustrating an implementation form where a camera and an electronic apparatus according to an exemplary embodiment of the present invention are separate components.

FIG. 19 is a view illustrating an embodiment where an electronic apparatus does not include a photographing unit. Referring to FIG. 19, an image photographing apparatus 200 for a vehicle which is provided separately from the electronic apparatus 100 for a vehicle may configure a system according to an exemplary embodiment of the present invention using a wired/wireless communication scheme.

The electronic apparatus 100 for a vehicle may include a display unit 131, a user input unit 121, and a microphone unit 123 which are provided to a front of a housing 191.

The image photographing apparatus 200 for a vehicle may include a camera 222, a microphone 224, and an attaching unit 281.

Figure 20:
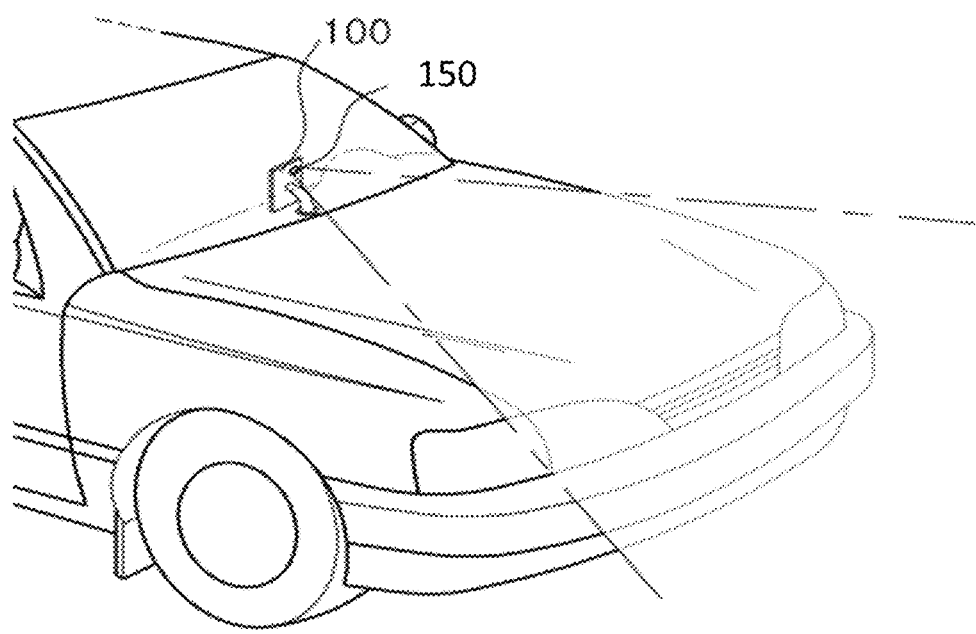
FIG. 20 is a view illustrating an implementation form where a camera and an electronic apparatus according to an exemplary embodiment of the present invention are integral components.

FIG. 20 is a view illustrating an embodiment where the electronic apparatus includes the photographing unit. Referring to FIG. 20, when the electronic apparatus 100 includes the photographing unit 150, the electronic apparatus 100 may be an apparatus in which the photographing unit 150 of the electronic apparatus 100 photographs a front of the vehicle and a display portion of the electronic apparatus 100 may be recognized by the user. Accordingly, a system according to an exemplary embodiment of the present invention may be implemented.

Figure 21:
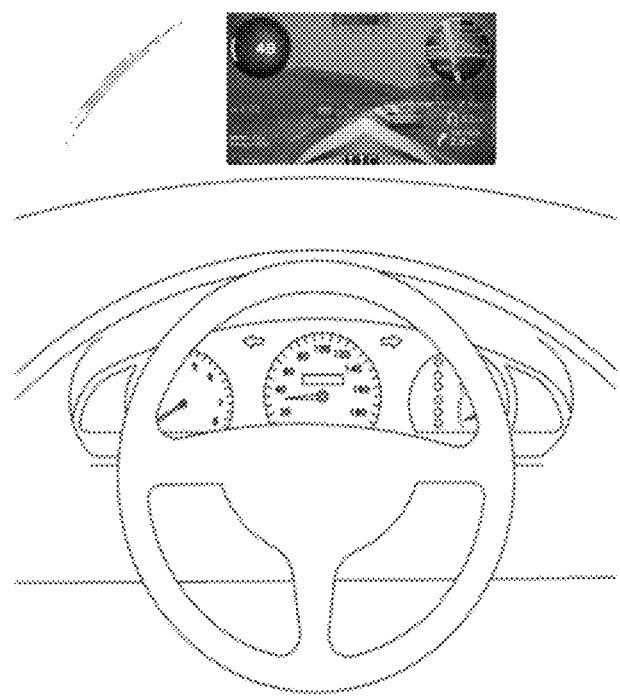
FIG. 21 is a view illustrating an implementation form using a head-up display (HUD) and an electronic apparatus according to an exemplary embodiment of the present invention.

FIG. 21 is a view illustrating an embodiment using a head-up display (HUD). Referring to FIG. 21, the HUD may display the augmented reality guidance screen on the head-up display through wired/wireless communications with other devices.

As an example, the augmented reality may be provided through the HUD using a front window of the vehicle or an image overlay using a separate image output apparatus, and the augmented reality providing unit 160 may generate an interface image or the like which overlays a reality image or a window. Thereby, an augmented reality navigation or a vehicle infotainment system may be implemented.

Furthermore, the curve guidance method according to various exemplary embodiments of the present invention described above may be implemented in a program so as to be provided to the server or devices. Accordingly, the respective apparatuses may be connected to the server or the device in which the program is stored to download the program.

In addition, the control method according to various exemplary embodiments of the present invention described above may be implemented in the program and be provided to be stored in various non-transitory computer-readable medium. The non-transitory computer-readable medium does not mean a medium storing data for a short period such as a register, a cache, a memory, or the like, but means a medium which semi-permanently stores the data and is readable by a machine. Specifically, various applications or programs described above may be provided to be stored in the non-transitory computer readable medium such as a compact disc (CD), a digital versatile disk (DVD), a hard disk, a Blu-ray disk, a universal serial bus (USB), a memory card, a read-only memory (ROM), or the like.

As described above, according to various exemplary embodiments of the present invention, since whether or not the road on which the vehicle is to be driven after the predetermined time is the curve section may be judged in real time using existing retained link information, the curve guidance may be performed without needing the pre-survey for the curve sections across the country, which incurs high cost.

As well, when the degree of risk for the curve section in which the vehicle is to be driven after the predetermined time is guided, since the guidance that a curvature of the curve section and current driving speed of the vehicle are simultaneously considered is provided, the user may more effectively cope with the curve section. As an example, in a case in which because the curvature of the curve section is large, but the vehicle is currently driven at low speed, the vehicle has low possibility that it will be exposed to a risk in the curve section, the degree of risk is not guided, which prevents the driving of the user from being disturbed due to an unnecessary guidance, thereby making it possible to improve safety of the user.

Further, according to various exemplary embodiments of the present invention, whether or not the degree of risk is guided is controlled by reflecting factors capable of influencing the degree of risk of the curve section which is felt by a sensory organ of the user, for example, a road rank (e.g., information on whether the road is a highway or a general road), a road width (e.g., information on whether a road width is wide or narrow, or road width information), the number of lanes of the road (e.g., information on whether the number of lanes of the road is large or small, or information of the number of lanes of the road), a road slope (e.g., whether the road is an uphill road or a downhill road, or superelevation information), thereby making it possible to more accurately perform the guidance for the degree of risk of the curve section.

Further, according various exemplary embodiments of the present invention, since the degree of risk of the curve section is divided into two or more steps and is guided to the user, the user may recognize the degree of risk according to a situation in the curve section for each of the steps, thereby making it possible to more effectively cope with the curve section.

Hereinabove, although the exemplary embodiments of the present invention have been shown and described, it should be understood that the present invention is not limited to the disclosed embodiments and may be variously changed without departing from the spirit and the scope of the present invention. Therefore, the present invention should be construed as including all the changes, equivalents, and substitutions included in the spirit and scope of the present invention.

What is claimed is:

1. A curve guidance method comprising:
    obtaining link information corresponding to a road, the link information including a plurality of links;
    determining a first position of a start point and a second position of an end point on at least one of the plurality of links;
    determining a third position which is a position of a point on a link having a longest distance from a line segment connecting the first position and the second position; and
    judging a degree of risk of a curve section in which a vehicle is to be driven using a speed of the vehicle at a current position of the vehicle and a distance from the current position to the first position,
    wherein the judging of the degree of risk of the curve section comprises computing an angle of the link using the longest distance and judging the degree of risk of the curve section comparing the computed angle with a threshold angle.

2. The curve guidance method of claim 1, wherein the judging of the degree of risk of the curve section further comprises generating a circumscribed circle including the first position, the second position, and the third position.

3. The curve guidance method of claim 2, wherein, in the judging of the degree of risk of the curve section, the degree of risk of the curve section is judged using a radius of the generated circumscribed circle and the speed of the vehicle at the current position.

4. The curve guidance method of claim 3, wherein the judging of the degree of risk of the curve section further comprises:
    computing a centrifugal force to be applied to the vehicle in the curve section using the determined positions and the speed of the vehicle at the current position; and
    judging the degree of risk of the curve section based on the computed centrifugal force.

5. The curve guidance method of claim 4, wherein the judging of the degree of risk of the curve section further comprises;
    computing a threshold speed using the computed centrifugal force and the radius of the generated circumscribed circle; and
    judging the degree of risk of the curve section comparing the computed threshold speed with the speed of the vehicle at the current position.

6. The curve guidance method of claim 4, wherein, in the judging of the degree of risk of the curve section, the degree of risk of the curve section in which the vehicle is to be driven is judged by comparing the computed centrifugal force with a preset threshold value.

7. The curve guidance method of claim 6, wherein the preset threshold value includes a threshold value as a judgment reference of a risk level.

8. The curve guidance method of claim 7, wherein the obtaining of the link information comprises obtaining link attribute information,
    wherein the link information and the link attribute information are obtained from map data, and
    wherein the link attribute information includes at least one of identifier of the road, a start point and an end point of a reference link of a moving direction of the vehicle, a road number, a road name, a road length, road rank information, road width information, information of a number of lanes of the road, and road slope information.

9. The curve guidance method of claim 8, further comprising:
    computing a weight for adjusting the threshold value based on the link attribute information; and
    adjusting the threshold value based on the computed weight.

10. A curve guidance apparatus comprising:
    a link information obtaining unit obtaining link information corresponding to a road, the link information including a plurality of links;
    a speed sensing unit sensing a speed of a vehicle;
    a link position determining unit determining a first position of a start point and a second position of an end point on at least one of the plurality of links, and a third position which is a position of a point on a link having a longest distance from a line segment connecting the first position and the second position; and
    a controlling unit judging a degree of risk of a curve section in which the vehicle is to be driven using the speed of the vehicle at a current position of the vehicle and a distance from the current position to the first position,
    wherein the judging of the degree of risk of the curve section comprises computing an angle of the link using the longest distance and judging the degree of risk of the curve section comparing the computed angle with a threshold angle.

11. The curve guidance apparatus of claim 10, wherein the controlling unit includes a circumscribed circle generating unit generating a circumscribed circle including the first position, the second position, and the third position.

12. The curve guidance apparatus of claim 11, wherein the controlling unit judges the degree of risk of the curve section by using a radius of the generated circumscribed circle and the speed of the vehicle at the current position.

13. The curve guidance apparatus of claim 12, wherein the controlling unit includes:
    a centrifugal force computing unit computing a centrifugal force to be applied to the vehicle in the curve section using the determined positions and the speed of the vehicle at the current position, and
    a degree of risk judging unit judging the degree of risk of the curve section based on the computed centrifugal force.

14. The curve guidance apparatus of claim 13, wherein the degree of risk judging unit judges the degree of risk of the curve section in which the vehicle is to be driven by comparing the computed centrifugal force with a preset threshold value.

15. The curve guidance apparatus of claim 14, wherein the preset threshold value includes a threshold value as a judgment reference of a risk level.

16. The curve guidance apparatus of claim 15, wherein the link information obtaining unit further obtains link attribute information corresponding to the road,
    wherein the link information and the link attribute information are obtained from map data, and
    wherein the link attribute information includes at least one of identifier of the road, a start point and an end point of a reference link of a moving direction of the vehicle, a road number, a road name, a road length, road rank information, road width information, information of a number of lanes of the road, and road slope information.

17. The curve guidance apparatus of claim 16, wherein the controlling unit further includes a weight computing unit computing a weight for adjusting the threshold value based on the link attribute information, and adjusting the threshold value based on the computed weight.

18. A non-transitory computer readable storage medium with a computer program to execute a curve guidance method, the method comprising:
    obtaining link information corresponding to a road, the link information including a plurality of links;
    determining a first position of a start point and a second position of an end point on at least one of the plurality of links;
    determining a third position which is a position of a point on a link having a longest distance from a line segment connecting the first position and the second position; and
    judging a degree of risk of a curve section in which a vehicle is to be driven using a speed of the vehicle at a current position of the vehicle and a distance from the current position to the first position,
    wherein the judging of the degree of risk of the curve section comprises computing an angle of the link using the longest distance and judging the degree of risk of the curve section comparing the computed angle with a threshold angle.

* * * * *